United States Patent
Ishikawa et al.

[11] Patent Number: 6,122,426
[45] Date of Patent: Sep. 19, 2000

[54] OPTICAL CABLE AND OPTICAL CABLE CHAMBER ELEMENT

[75] Inventors: Hiroki Ishikawa; Yoshiyuki Suetsugu, both of Yokohama; Hideyuki Iwata, Mito; Kazunori Watanabe, Gifu; Ryouzo Nishikawa, Gifu; Toku Ishii, Gifu, all of Japan

[73] Assignees: Sumitomo Electric Industries, Ltd., Osaka; Nippon Telegraph and Telephone Corporation; Ube-Nitto Kasei Co., Ltd., both of Tokyo, all of Japan

[21] Appl. No.: 09/115,837

[22] Filed: Jul. 15, 1998

[30] Foreign Application Priority Data

| Jul. 15, 1997 | [JP] | Japan | 9-189878 |
| Jul. 23, 1997 | [JP] | Japan | 9-197389 |
| Jul. 23, 1997 | [JP] | Japan | 9-197413 |

[51] Int. Cl.⁷ ........................ G02B 6/44
[52] U.S. Cl. .................. 385/105; 385/104; 385/114
[58] Field of Search .............. 385/103, 104, 385/105, 110, 111, 112, 113, 114

[56] References Cited

U.S. PATENT DOCUMENTS

| 5,542,019 | 7/1996 | Pascher | 385/105 |
| 5,651,082 | 7/1997 | Eoll | 385/114 |
| 5,920,672 | 7/1999 | White | 385/110 |

FOREIGN PATENT DOCUMENTS

| 55-45087 | 3/1980 | Japan . |
| 61-72212 | 4/1986 | Japan . |
| 62-89915 | 4/1987 | Japan | 385/105 |
| 4-182611 | 6/1992 | Japan . |

*Primary Examiner*—Jon Henry
*Attorney, Agent, or Firm*—Pillsbury Madison & Sutro LLP

[57] ABSTRACT

An optical cable has an S-Z stranded part in which plurality of chamber elements containing optical fibers are assembled around a central member in an S-Z strand in the state where their bottom faces are in contact with the central member. Each chamber element has such a characteristic that its flexural rigidity in the depth direction of its fiber containing cavity is smaller than that in the widthwise direction thereof. Assuming, of distortion energy of the chamber element in an S-Z reverse portion within the S-Z stranded part, the distortion energy in the case where the bottom face of the chamber element is in contact with the central member to be $U_1$, and the distortion energy in the case where a side face of the chamber element is in contact with the central member to be $U_2$, a relational expression of $\Delta U = U_1 - U_2 \leq 0.2 (mJ/mm)$ is satisfied.

14 Claims, 14 Drawing Sheets

OPTICAL CABLE AND OPTICAL CABLE CHAMBER ELEMENT

BACKGROUND OF THE INVENTION

1. Field of the Invention

The present invention relates to an optical cable laid in the underground, on the ground, in the air, or on the sea bottom; and a chamber element utilized when optical fibers are mounted in the optical cable.

2. Related Background Art

Conventionally known as a technique in such a field is that disclosed in Japanese Patent Application Laid-Open No. 55-45087. The optical cable disclosed in this publication comprises a plurality of chamber elements made of a plastic each provided with a fiber containing cavity for containing a coated optical fiber, a loose tube, a ribbon fiber, or the like (hereinafter simply referred to as "optical fiber" in general terms); and a tension member functioning as a central member. The individual chamber elements containing optical fibers are assembled around the central member in the state where their bottom faces are in contact with the central member. Each chamber element has a bottom part and a pair of side wall parts rising from both ends of the bottom part. Namely, the chamber element has substantially a U-shaped cross section. The chamber element is extrusion-molded as a straight elongated member. It is considered preferable that the bottom part and side wall parts of the chamber element each have a thickness of 0.5 mm or greater.

Also, Japanese Patent Application Laid-Open No. 4-182611 discloses an optical cable in which a plurality of chamber elements each having substantially a U-shaped cross section and containing an optical fiber therein are bent along the outer periphery of a central member and are assembled in an S-Z strand around the central member. In this case, as shown in FIG. 18, in order for fiber containing cavities 102 to face outward, chamber elements 100 are assembled around the central member 110 in the state where their bottom faces are in contact with the central member 110. Hence, in the S-Z locus defined by each chamber element 100, at each position Re (hereinafter referred to as "S-Z reverse portion"; see FIG. 19) where S strand turns into Z strand or vice versa, it is necessary to bend the chamber element 100 in the widthwise direction x of its fiber containing cavity 102 as shown in FIG. 20. On the other hand, at each intermediate position (hereinafter referred to as "S-z transit portion") between adjacent S-Z reverse portions, it is necessary to bend the chamber element 100 in the depth direction y of its fiber containing cavity 102 as shown in FIG. 21.

The conventional optical cables and chamber elements, however, have the following problems. Namely, in the case where wide chamber elements each having a fiber containing cavity whose width is greater than its depth are employed and assembled around a central member in an S-Z strand, the chamber element to be bent in the width direction x at S-Z reverse portions Re (see FIG. 20) may bend in the depth direction y (see FIG. 21 or 22). In this case, the chamber element may be twisted such that a side face thereof comes into contact with the central member as shown in FIGS. 23 and 24, whereby the fiber containing cavity fails to face correctly outward (this state being hereinafter referred to as "turn-over").

On the other hand, in the case where elongated chamber elements each having a fiber containing cavity whose depth is greater than its width are employed and assembled around a central member in an S-Z strand, the chamber element to be bent in the depth direction y at S-Z transit portions Tr (see FIG. 21 or 22) may bend in the widthwise direction x (see FIG. 20). Also in this case, the chamber element may be twisted such that a side face thereof comes into contact with the central member as shown in FIGS. 23 and 24, whereby the fiber containing cavity fails to face correctly outward.

In either case, when the chamber element is turned over, a side face thereof comes into contact with the central member, whereby the fiber containing cavity fails to face correctly outward. Then, the optical fiber contained in the fiber containing cavity of the chamber element is twisted together with the chamber element. As a result, so-called microbend may occur in the optical fiber, thereby enhancing its transmission loss. Also, in the case where, after an optical cable is laid, optical fibers are to be taken out from the optical cable so as to branch out, if a chamber element is turned over, it will be difficult to take out the optical fibers, thus lowering workability.

SUMMARY OF THE INVENTION

In order to overcome the above-mentioned problems, it is an object of the present invention to provide an optical cable in which chamber elements are less likely to turn over in any of S-Z reverse portions and S-Z transit portions and which is excellent in transmission characteristics and easiness of taking out optical fibers therefrom, and an optical fiber chamber element applicable to this optical cable.

The optical cable in accordance with the present invention is an optical cable having a plurality of optical fibers. This optical cable comprises a central member and a plurality of chamber elements each having a fiber containing cavity for containing an optical fiber. Each chamber element has such a characteristic that its flexural rigidity in the depth direction of the fiber containing cavity is smaller than that in the widthwise direction thereof. The optical cable has an S-Z stranded part in which the individual chamber elements containing optical fibers are assembled around the central member in an S-Z strand with their bottom faces being in contact with the central member. Assuming, of distortion energy of a chamber element in an S-Z reverse portion within the S-Z stranded part, the distortion energy yielded when the bottom face of the chamber element is in contact with the central member to be $U_1$, and the distortion energy yielded when a side face of the chamber element is in contact with the central member to be $U_2$, a relational expression of $\Delta U = U_1 - U_2 \leq 0.2 \text{(mJ/mm)}$ is satisfied.

When constituting an optical cable in which a plurality of chamber elements are assembled around a central member in an S-Z strand, it is necessary to maintain the state where, in the whole S-Z locus defined by each chamber element, the bottom face of the chamber element is securely in contact with the central member, such that its fiber containing cavity correctly faces outward. To this end, at each S-Z transit portion of the S-Z locus defined by the chamber element, it is necessary for the chamber element to be bent in the depth direction along the outer periphery of the central member. For example, a chamber element whose fiber containing cavity has a depth greater than its width is more stable when bent in the widthwise direction than in the depth direction. Hence, in order for the chamber element to be easily bent in the widthwise direction, it is necessary for the chamber element to have a flexural rigidity in the depth direction of the fiber containing cavity smaller than that in the widthwise direction thereof.

On the other hand, in each S-Z reverse portion of the S-Z locus defined by each chamber element, the chamber element has to be bent in the widthwise direction. For example, a chamber element whose fiber containing cavity has a width greater than its depth is more stable when bent in the depth direction than in the widthwise direction. Hence, in order for the chamber element to be easily bent in the depth direction, it is necessary for the chamber element to have a flexural rigidity in the depth direction smaller than that in the widthwise direction. Namely, in order to prevent chamber elements from turning over at any of the S-Z reverse portions and S-Z transit portions, simply taking account of the flexural rigidity thereof is insufficient.

In view of these points, the inventors have diligently carried out studies in order to prevent chamber elements from turning over at S-Z reverse portions and S-Z transit portions. In the process of studying, the inventors have taken account of the distortion energy of each chamber element (energy accumulated in the chamber element when bent in a certain direction) at S-Z reverse portions. Namely, assuming that $U_1$ represents the distortion energy in the state where the bottom face of the chamber element is in contact with the central member so that its fiber containing cavity correctly faces outward, and $U_2$ represents the distortion energy in the state where a side face of the chamber element is in contact with the central member so that its fiber containing cavity turns over, their relationship has been taken into consideration. Then, experiments have been repeatedly carried out for investigating the relationship between the difference in distortion energy $\Delta U = U_1 - U_2$ and the ratio at which chamber elements turn over. As a result, the inventors have found out that the turn-over ratio of a chamber element reduces when its flexural rigidity in the depth direction of the fiber containing cavity thereof is smaller than that in the widthwise direction of the fiber containing cavity while the difference in distortion energy $\Delta U$ is not greater than 0.2 mJ/mm, thereby yielding very good effects in practice.

When the flexural rigidity of a chamber element in the depth direction is made smaller than that in the widthwise direction, the chamber element can easily be bent in the depth direction at S-Z transit portions of its S-Z locus. As a consequence, this optical cable can securely maintain the state where the fiber containing cavity of the chamber element faces outward at the S-Z transit portions of the S-Z locus. On the other hand, when the difference in distortion energy $\Delta U$ is not greater than 0.2 mJ/mm, the optical cable can also securely maintain the state where the fiber containing cavity of the chamber element faces outward at S-Z reverse portions of the S-Z locus where the chamber element is bent in the widthwise direction.

Preferably, in this case, the chamber elements are formed by a mixed resin composed of PBT resin and HDPE resin, or a mixed resin composed of PC/PBT resin and HDPE resin.

In order to prevent chamber elements from turning over at S-Z reverse portions and S-Z transit portions, the inventors have also carried out diligent studies concerning materials of chamber elements used in optical cables. When selecting materials for forming chamber elements used in an optical cable, it is necessary to take account of their physical properties such as shock resistance, rigidity, strength, and the like, as well as environmental resistance properties such as low-temperature brittleness, anti-stress-cracking performance, and the like. In view of these points, the inventors have repeatedly conducted experiments concerning various kinds of materials in order to find out optimal materials for forming chamber elements used in optical cables. Then, the inventors have found that, when a mixed resin composed of PBT resin and HDPE resin, or a mixed resin composed of PC/PBT resin (in which PBT resin and polycarbonate resin are blended together) and HDPE resin is used, very good effects in practice can be obtained.

When a chamber element is made of PBT resin or PC/PBT resin, the rigidity of the chamber element itself becomes greater than necessary. When such a chamber element is bent at an S-Z reverse portion in the widthwise direction, a side face of the chamber element may come into contact with the central member, whereby its fiber containing cavity fails to face correctly outward. Also, in the case where an optical cable is laid under an environment where ambient temperature is greatly variable, HDPE resin may be recrystallized within a chamber element made thereof. In this case, the chamber element may shrink in its longitudinal direction, thereby affecting its S-Z reversal angle and S-Z strand pitch.

By contrast, when a chamber element is made of a mixed resin composed of PBT resin and HDPE resin, or a mixed resin composed of PC/PBT resin and HDPE resin, the chamber element can have an appropriate softness while keeping its rigidity. Also, even when HDPE resin is recrystallized due to changes in ambient temperature, the shrinkage of the chamber element is minimized since PBT resin or PC resin/PBT resin has a sufficient rigidity.

Preferably, HDPE resin occupies 20% to 80% by volume of the mixed resin. As a consequence, while the rigidity of chamber elements is maintained, the chamber elements can be quite effectively restrained from shrinking upon changes in ambient temperature.

Preferably, each chamber element comprises a bottom part and a pair of side wall parts rising from both ends of the bottom part, while a fiber containing cavity is defined by the bottom part and the side wall parts. As a consequence, the chamber element has substantially a U-shaped cross section, whereby its fiber containing cavity can contain various kinds of optical fibers such as coated optical fiber, loose tube, ribbon fiber, and the like.

Preferably, each chamber element further comprises a tension member disposed at a center portion of the bottom part in the widthwise direction thereof. As a consequence, the chamber element can be provided with tension resistance without enhancing its flexural rigidity in the widthwise direction more than necessary. Hence, even when tension is applied to chamber elements which are being assembled onto a central member, no distortion would occur in optical fibers. As a result, an optical cable can be manufactured while maintaining the reliability of each optical fiber.

Further, it is preferred that the tension member be disposed in the state where its center axis is close to the bottom face. Namely, the tension member is disposed such that its center axis is dislocated toward the bottom face of the chamber element from the center line between the inner face of the bottom part and the outer face of the bottom part (bottom face of the chamber element).

In general, when providing the bottom part of a chamber element used in an optical cable with a tension member, the tension member is introduced into a die, and a molten resin is extruded from a nozzle together with the tension member. When thus extruded resin hardens, the amount of shrinkage of the resin forming the bottom part of the chamber element in the depth direction thereof in the part where the tension member exists is different from that in the other parts. Namely, the amount of shrinkage of the resin in the part where the tension member exists becomes smaller than the amount of shrinkage of the resin in the other parts. As a result, irregularities would occur in the floor face of the fiber containing cavity, i.e., the inner face of the bottom part.

Here, when bending or tensile force is applied to the optical cable, a force directed to the center axis of the optical cable acts on an optical fiber contained in the fiber containing cavity of a chamber element. Then, the optical fiber is pressed against the floor face of the fiber containing cavity. When the floor face of the fiber containing cavity has irregularities, the optical fiber is bent along the irregularities, thereby generating so-called microbend. As a result, transmission characteristics of the optical cable are deteriorated. Also, the thickness of the bottom part of the chamber element is very small (about 0.4 to 1.5 mm). The tension member has a certain degree of thickness as well. Consequently, the influence on the transmission characteristics of the optical cable exerted by the irregularities existing in the floor face of the fiber containing cavity is not negligible. It becomes an important issue in an optical cable having a small diameter in which a number of optical fibers are mounted, in particular.

By contrast, when a tension member is disposed with respect to a chamber element in the state where its center axis is close to the bottom face of the chamber element, the above-mentioned irregularities can be restrained from occurring due to the difference in resin shrinkage amount between the part where the tension member exists and the other parts. As a consequence, it becomes unnecessary to eliminate thus occurring irregularities, for example, by shaving them off with a cutting tool or by flattening them against a heated plate or roller. Hence, high-performance chamber elements used in an optical cable can be produced economically without increasing manufacturing steps. Further, when forming a chamber element from a thermoplastic resin, it becomes unnecessary to add inorganic matters or the like, which may deteriorate smoothness of the fiber containing cavity, to the thermoplastic resin.

Preferably, the tension member is disposed while being close to the bottom face. Namely, the tension member is disposed such as to be dislocated, as a whole, toward the bottom face of the chamber element from the center line between the inner face of the bottom part and the outer face of the bottom part (bottom face of the chamber element). As a consequence, the tensile member is placed farther away from the floor face of the fiber containing cavity (inner face of the bottom part), whereby the irregularities can be quite effectively restrained from occurring. In this case, the tensile member may be partly exposed from the bottom face of the chamber element (outer face of the bottom part).

As the central member of the optical cable, a thickening layer made of a synthetic resin incorporating therein a steel strand may be used. Also, a slotted member containing a plurality of optical fibers may be used as the central member.

The optical cable chamber element in accordance with the present invention has a fiber containing cavity for containing an optical fiber and is adapted to be stranded around a central member of an optical cable. This optical cable chamber element comprises a bottom part, and a pair of side wall parts rising from both ends of the bottom part and defining, together with the bottom part, a fiber containing cavity. The chamber element has such a characteristic that the flexural rigidity in the depth direction of the fiber containing cavity is smaller than that in the widthwise direction thereof. Assuming, of distortion energy of the chamber element in an S-Z reverse portion within an S-Z stranded part in which the chamber element is assembled around the central member, the distortion energy yielded when the bottom face of the bottom part of the chamber element is in contact with the central member to be $U_1$, and the distortion energy yielded when a side face of the side wall parts of the chamber element is in contact with the central member to be $U_2$, a relational expression of $\Delta U = U_1 - U_2 \leq 0.2 \text{(mJ/mm)}$ is satisfied.

When this chamber element is assembled around the central member in an S-Z strand, the state where the fiber containing cavity faces outward can be maintained at S-Z reverse portions in the S-Z locus where the chamber element is bent in the widthwise direction. While the chamber element is bent in the width direction at S-Z transit portions of the S-Z locus, the state where the fiber containing cavity faces outward can also be maintained in this case.

Preferably, the bottom part and side wall parts of the chamber element are integrally molded from a mixed resin composed of PBT resin and HDPE resin. Also, the bottom part and side wall parts of the chamber element may be integrally molded from a mixed resin composed of PC/PBT resin and HDPE resin. Further, it is preferred that HDPE resin occupy 20% to 80% by volume of the mixed resin. On the other hand, the chamber element preferably comprises a tension member disposed at a center portion of its bottom part in the widthwise direction thereof. Preferably, the tension member is disposed such that its center axis is close to the bottom face. Preferably, the tension member is disposed such as to be close to the bottom face.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In the following, preferred embodiments of the optical cable and optical cable chamber element in accordance with the present invention will be explained in detail with reference to the accompanying drawings.

Figure 1:
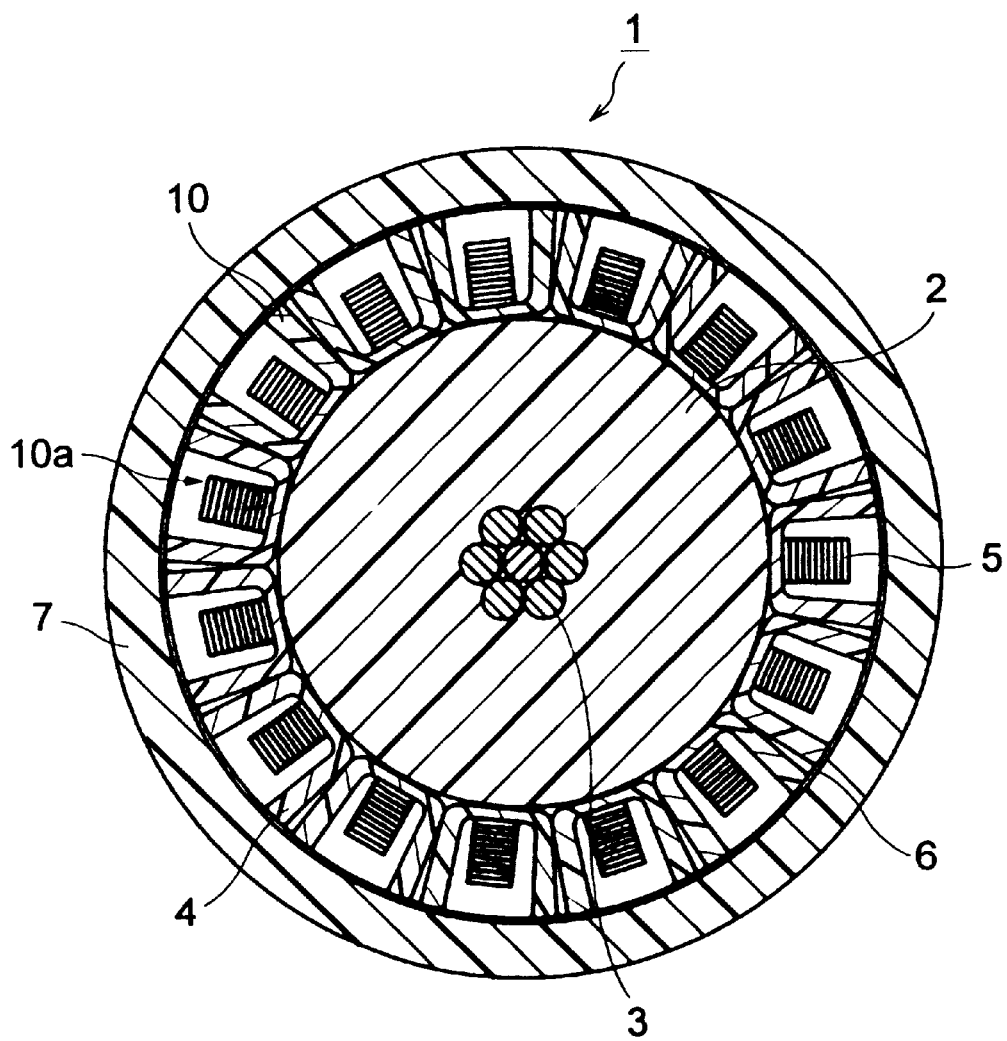
FIG. 1 is a sectional view showing a first embodiment of the optical cable in accordance with the present invention.
Figure 2:
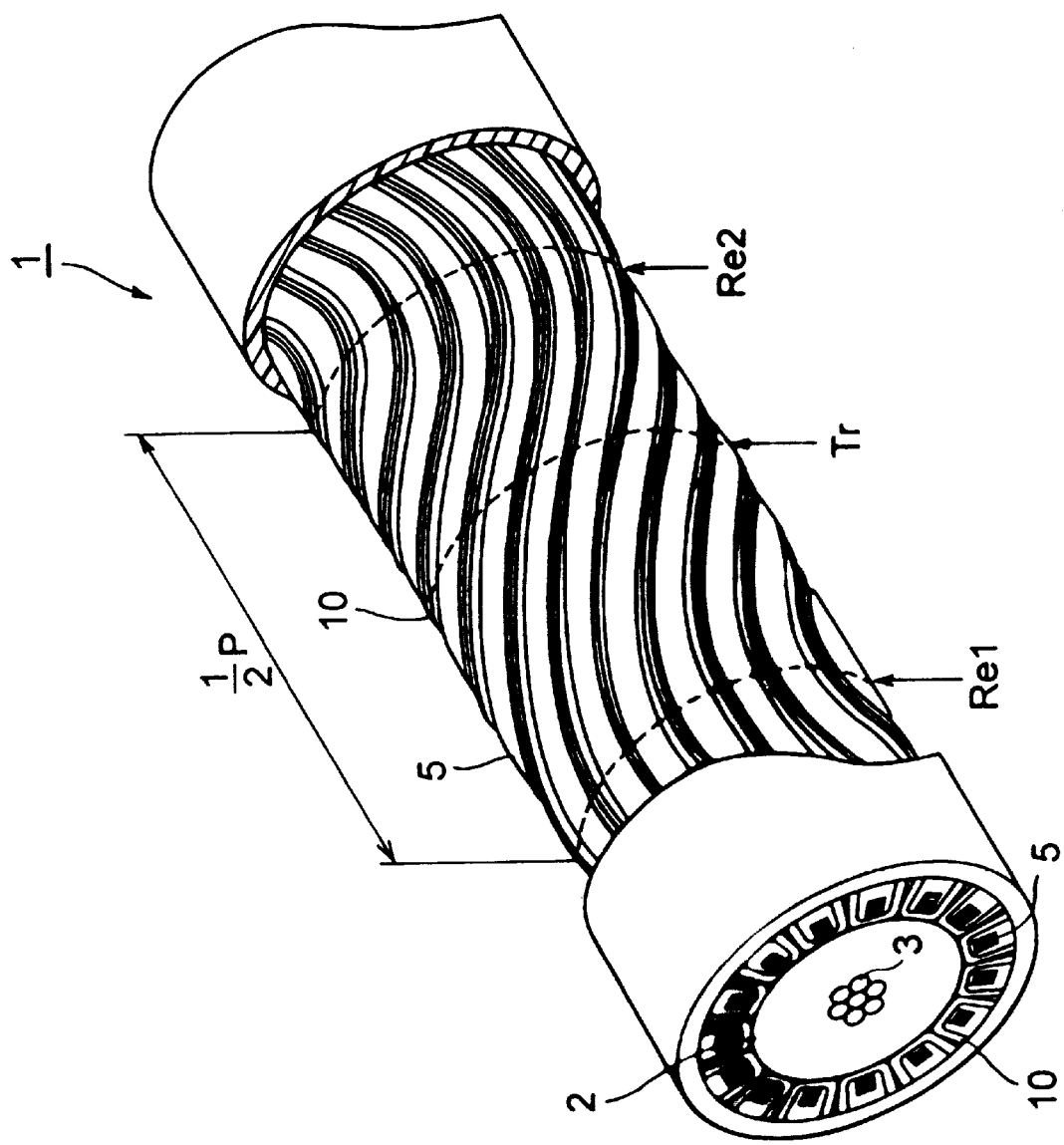
FIG. 2 is a perspective view showing the optical cable of FIG. 1.

FIG. 1 is a sectional view of an optical cable in accordance with the present invention. On the other hand, FIG. 2 is a perspective view showing the optical cable in accordance with the present invention. As shown in FIG. 1, disposed at the center of the optical cable 1 is an elongated thickening layer (central tension member) 2 functioning as a central member for the optical cable 1. The thickening layer 2 is made of a synthetic resin and has a diameter of 25 mm. Embedded in the center of the thickening layer 2 is a steel strand 3. This steel strand 3 is constituted by 7 steel wires, each having a diameter of 2.0 mm, stranded together. Assembled around the outer periphery of the thickening layer 2 in an S-Z strand are chamber elements 10 each having a fiber containing cavity 10a (see FIG. 2). In the optical cable 1, 15 chamber elements 10 are assembled with an S-Z strand pitch P (twice the distance between S-Z reverse portions Re1 and Re2 adjacent to each other) of 600 mm and an S-Z reversal angle φ of 275°.

When assembling the optical cable 1, each chamber element 10 is bent along the outer periphery of the thickening layer 2. The bottom face of the chamber element 10 is in contact with the outer periphery of the thickening layer 2, while its fiber containing cavity 10a faces outward. A plurality of (e.g., 10) ribbon fibers (optical fibers) are stacked within the fiber containing cavity 10a. Around the chamber elements 10 assembled in an S-Z strand, a holding tape 6 made of nonwoven or the like is wound tightly. Further disposed around the holding tape 6 is an outside cladding 7 made of low-density polyethylene, thereby protecting the inside of the optical cable 1.

Figure 3:
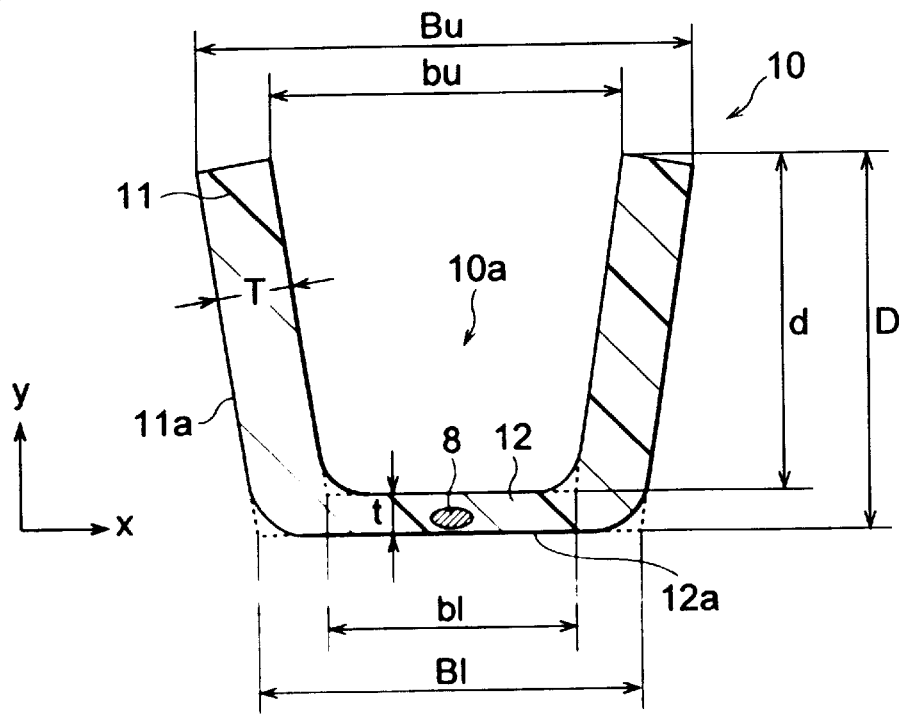
FIG. 3 is a sectional view showing a chamber element employed in the optical cable shown in FIG. 1.
Figure 4:
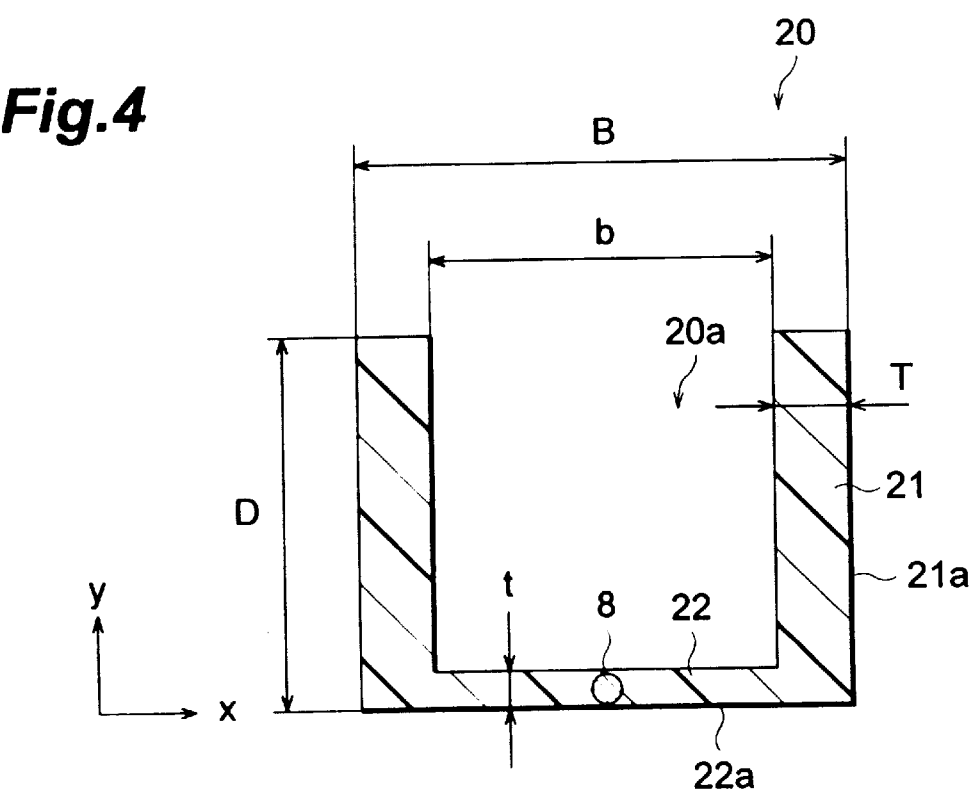
FIG. 4 is a sectional view of an optical cable chamber element.

Each chamber element 10 is made as a straight elongated member. Also, as shown in FIG. 3, the chamber element 10 comprises a bottom part 12 and a pair of side wall parts 11 rising from both ends of the bottom part 12. The fiber containing cavity 10a is defined by the bottom part 12 and the side wall parts 11. As a consequence, the chamber element 10 has substantially a U-shaped cross section. The fiber containing cavity 10a can contain various kinds of optical fibers such as coated optical fiber, loose tube, ribbon fiber, and the like.

A tension member 8 is disposed within the bottom part 12 of the chamber element 10 at a center portion in the widthwise direction x of the fiber containing cavity 10a. As a consequence, the chamber element 10 can be provided with tension resistance without increasing the flexural rigidity of the chamber element 10 in the widthwise direction more than necessary. Hence, when tension is applied to the chamber element 10 being assembled onto the thickening layer 2, no distortion occurs in the ribbon fibers 5. As a result, the optical cable 1 can be manufactured while maintaining the reliability of the optical fibers. As a material for the tension member 8, aromatic polyamide fiber (product name: KEVLAR, manufactured by E. I. DuPont de Nemours & Co.), FRP, glass fiber, and the like are preferable.

The chamber element has such a size that Bu=6.6 mm, bu=4.6 mm, Bl=5.0 mm, bl=3.5 mm, D=5.0 mm, d=4.5 mm, T=1.0 mm, and t=0.5 mm. When determining these dimensions, designing is carried out in view of the following points. First, in the case where the chamber elements 10 are assembled around the thickening layer 2 of the optical cable 1 in an S-Z strand, each chamber element 10 is bent with the smallest radius of curvature at an S-Z transit portion Tr (intermediate position between S-Z reverse portions Re1, Re2 adjacent to each other; see FIG. 2) of the S-Z locus defined by the chamber element 10. Also, in this case, it is necessary to maintain the state where the bottom face 12a of the chamber element 10 is securely in contact with the thickening layer 2 while the fiber containing cavity 10a faces outward. The chamber element 10 is hence configured such that the flexural rigidity in the depth direction y is smaller than that in the widthwise direction x.

Namely, in the chamber element 10, the flexural rigidity $EI_1$ in the depth direction y of the fiber containing cavity 10a is $9.11 \times 10^4$ (N·mm$^2$) On the other hand, the flexural rigidity $EI_2$ in the widthwise direction x of the fiber containing cavity 10a is $1.06 \times 10^5$ (N·mm$^2$). That is, the flexural rigidity $EI_1$ in the depth direction y is smaller than the flexural rigidity $EI_2$ in the widthwise direction x. The optical cable 1 in which such chamber elements 10 are assembled around the thickening layer 2 in an S-Z strand can maintain the state in which their fiber containing cavities 10a face outward at the S-Z transit portion Tr where the chamber elements 10 are bent in the depth direction y with the smallest radius of curvature.

On the other hand, at an S-Z reverse portion Re (see FIG. 2) of the S-Z locus defined by each chamber element 10, it is necessary for the chamber element 10 to be bent in the widthwise direction x. Here, the chamber element 10 whose flexural rigidity in the depth direction y is smaller than that in the widthwise direction x becomes more stable when bent in the depth direction y than in the widthwise direction x. Consequently, at the S-Z reverse portion Re, when no means are provided, the chamber element 10 to be bent in the widthwise direction x would bend in the depth direction y so as to turn over. The inventors have diligently carried out studies in order to overcome this problem and, in the process of studying, have taken account of distortion energy of each chamber element 10 (energy accumulated in the chamber element 10 when bent in a certain direction) in S-Z reverse portions in the S-Z locus defined by the chamber element 10 in the area where such chamber elements 10 are assembled in an S-Z strand.

Namely, assuming that $U_1$, represents the distortion energy in the state where the bottom face 12a of the chamber element 10 is in contact with (circumscribes) the thickening layer 2 so that the fiber containing cavity 10a correctly faces outward, and $U_2$ represents the distortion energy in the state where a side face 11a of the chamber element 10 is in contact with (circumscribes) the thickening layer 2 so that the chamber element 10 turns over, their relationship has been taken into consideration. Then, experiments have been repeatedly carried out for investigating the relationship between the difference in distortion energy $\Delta U = U_1 - U_2$, i.e., the difference between distortion energy levels before and after the chamber element 10 turns over, and the ratio at which the chamber element 10 turns over. In the experiments, a plurality of groups of chamber elements were prepared with different structures, and were assembled onto thickening layers in S-Z strands with different pitches. Then, in each case, turned-over states of chamber elements at S-Z reverse portions were confirmed through visual observation, thereby investigating the relationship between the distortion energy difference $\Delta U$ and the ratio at which chamber elements turn over.

For these experiments, chamber elements 10, 20, 30, 40, and 50 respectively shown in FIGS. 3, 4, 5, 6, and 7 were used. Here, the chamber element 20 shown in FIG. 4 incorporates therein a tension member 8 at a center portion of its bottom part 22 in the widthwise direction x. The chamber element 20 has such a size that B=6.6 mm, b=4.6 mm, D=5.0 mm, T=1.0 mm, and t=0.5 mm. As the tension member 8, 1140-denier aromatic polyamide fiber is used.

Figure 5:
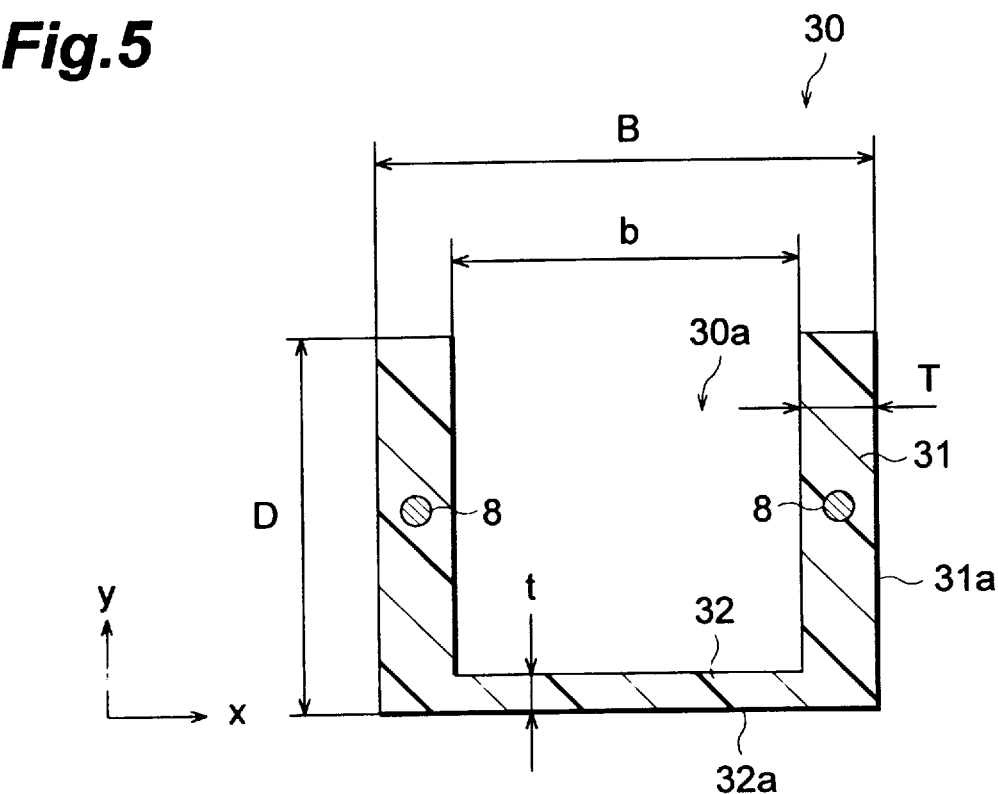
FIG. 5 is a sectional view of an optical cable chamber element.

The chamber element 30 shown in FIG. 5 incorporates no tension member in its bottom part 32. Instead, both side wall parts 31 of the chamber element 30 each incorporate therein a tension member 8 at a center portion thereof in the depth direction y. As with the chamber element 20 shown in FIG. 4, the chamber element 30 has such a size that B=6.6 mm, b=4.6 mm, D=5.0 mm, T=1.0 mm, and t=0.5 mm. As the tension member 8, 1140-denier aromatic polyamide fiber is used. On the other hand, in the chamber element 40 shown in FIG. 6, no tension member is incorporated in any of its sidewall parts 41 and bottom part 42. The chamber element 40 has such a size that B=5.6 mm, b=4.6 mm, D=5.0 mm, T=0.5 mm, and t=0.5 mm.

Figure 7:
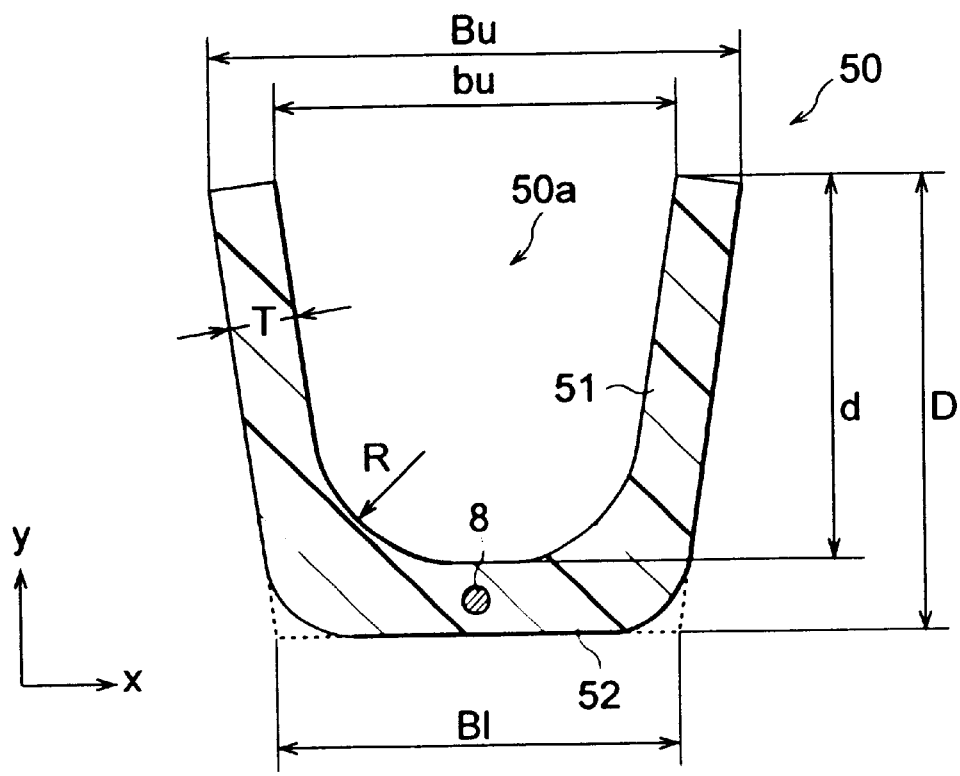
FIG. 7 is a sectional view of an optical cable chamber element.

In the chamber element 50 shown in FIG. 7, a tension member 8 is incorporated in its bottom part 52 at a center portion thereof in the widthwise direction x. As the tension member 8, 195-denier aromatic polyamide fiber is used. The chamber element 50 has such a size that Bu=6.2 mm, bu=4.7 mm, Bl=4.7 mm, D=5.5 mm, d=4.6 mm, T=0.8 mm, and t=0.5 mm. The floor face of the fiber containing cavity 50a has a radius of curvature R of 1.8 mm. Each of the above-mentioned chamber elements 20, 30, 40, and 50 has such a characteristic that the flexural rigidity in the depth direction y of the fiber containing cavity is smaller than that in the widthwise direction x of the fiber containing cavity (though their results of calculation are omitted).

In these experiments, for the chamber elements 20, 30, and 40, an elongated thickening layer having a diameter of 25 mm was used as a central member. Around the thickening layer, 12 chamber elements were assembled in an S-Z strand. For the chamber elements 10 and 20 shown in FIGS. 3 and 4, S-Z strand pitches were set to 400 mm, 500 mm, 600 mm, 700 mm, and 800 mm. For the chamber element 30 shown in FIG. 5, S-Z strand pitches of 800 mm, 900 mm, 1000 mm, and 1200 mm were used. For the chamber element 40 shown in FIG. 6, S-Z strand pitches of 500 mm, 600 mm, 700 mm, and 800 mm were used. Also, the experiments were carried out while the reversal angle $\phi$ in the S-Z strand was held at 275° for each chamber element.

Figure 8:
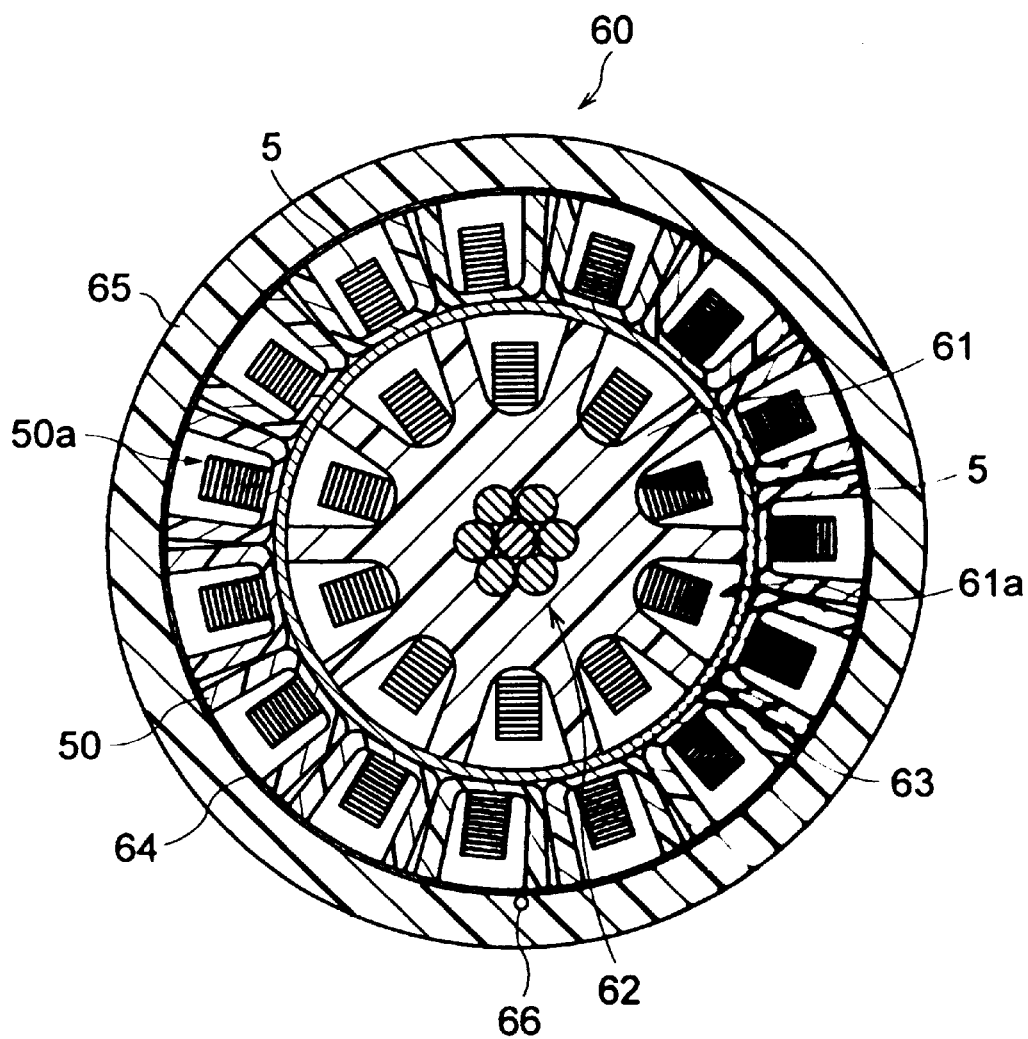
FIG. 8 is a sectional view showing a second embodiment of the optical cable in accordance with the present invention.

For the chamber element 50 shown in FIG. 7, on the other hand, an optical cable 60 (having an outside diameter of 39 mm) shown in FIG. 8 was prepared, and the relationship between the distortion energy difference $\Delta U$ and the ratio at which chamber elements turn over was investigated. Disposed at the center of this optical cable 60 is an elongated slotted member 61 which functions as a central member. The slotted member 61 is made of a synthetic resin such as HDPE resin or the like and has a diameter of 20 mm. Embedded in the center of the slotted member 61 is a steel strand 62. The steel strand 62 is constituted by 7 steel wires, each having a diameter of 2 mm, stranded together.

The outer periphery of the slotted member 61 is formed with 10 slots 61a extending in an S-Z form along the longitudinal direction of the slotted member 61. In each slot 61a, 10 ribbon fibers (optical fibers) 5 are stacked. Around the outer periphery of the slotted member 61 containing the ribbon fibers 5, a holding tape 63 made of nonwoven or the like is wound tightly. The outside diameter of the slotted member 61 wound with the holding tape 63 is 23.7 mm. Assembled in an S-Z strand around the holding tape 63 are 15 chamber elements 50. Stacked within the fiber containing cavity 50a of each chamber element 50 are 10 fiber ribbons 5. Around the chamber elements 50 assembled in an S-Z strand, a holding tape 64 is wound tightly. Further disposed around the holding tape 64 is an outside cladding 65 having a thickness of 1.5 mm made of low-density polyethylene. The outside cladding 65 incorporates therein a tearing wire 66. In the experiments, while the reversal angle $\phi$ was set to 275°, an optical cable 60 having an S-Z strand pitch P of 650 mm and an optical cable 60 having an S-Z strand pitch P of 800 mm were prepared.

Table 1 shows results of calculation of distortion energies $U_1$, $U_2$, and $\Delta U$ at S-Z reverse portions in each chamber element under the above-mentioned conditions. Here, assuming that the layer center radius to be a, reversal angle to be $\phi$, and S-Z strand pitch to be P, the radius of curvature $\rho$ at each S-Z reverse portion was determined by $\rho = (P/\pi)^2 / [2 \cdot a \cdot (\pi\phi/180)]$. Then, assuming Young's modulus to be E, geometrical moment of inertia to be I, and radius of curvature at the S-Z reverse portion to be $\phi$, distortion energies $U_1$, $U_2$ of the chamber element at the S-Z reverse portion per unit length were determined as $U = \frac{1}{2} \cdot \Sigma(E_i \cdot I_i)/\rho^2$, where i is a suffix indicating a material of the chamber element.

Figure 9:
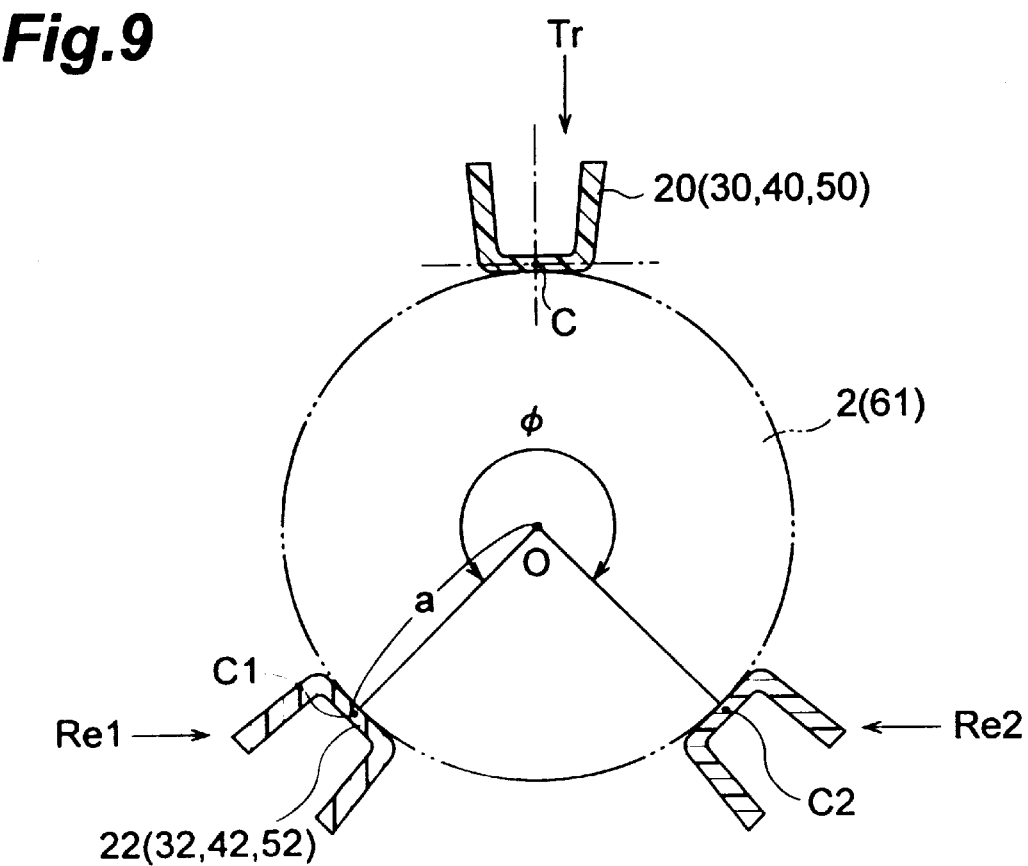
FIG. 9 is a sectional view for explaining layer center radius and S-Z reversal angle.

Here, Young's modulus E was determined according to the method defined in JIS-K-7127, and "2.5% modulus value" determined from the load upon 2.5% extension was employed. As shown in FIG. 9, the layer center radius a indicates the length from the center of the cross section of the central member 2 (61) to the center point C of the bottom part 22 (32, 42, 52) of each of the chamber elements 20 (30, 40, 50) assembled around the central member 2 (61). Here, the center point C of the bottom part refers to the intersection between the center line between the inner and outer faces of the bottom part and the axis of symmetry of the chamber element in the widthwise direction. Employed as the reversal angle $\phi$ is, as shown in FIG. 9, the angle formed between a line connecting the center point C1 in the cross section of the chamber element at the reverse portion Re1 and the cross-sectional center o of the optical cable, and a line connecting the center point C2 in the cross section of the chamber element at the reverse portion Re2 adjacent to the reverse portion Re1 and the cross-sectional center o of the optical cable.

TABLE 1

Distortion Energy in Each Chamber Element at Reverse Portion

| P (mm) | | 400 | 500 | 600 | 650 | 700 | 800 | 900 | 1000 | 1200 |
|---|---|---|---|---|---|---|---|---|---|---|
| ρ (mm) | | 113 | 176 | 253 | 297 | 345 | 450 | 570 | 704 | 1013 |
| C10 | U1 | 3.19 | 1.30 | 0.63 | | 0.34 | 0.20 | | | |
| | U2 | 3.21 | 1.31 | 0.63 | | 0.34 | 0.20 | | | |
| | ΔU | −0.02 | −0.01 | 0.00 | | 0.00 | 0.00 | | | |
| C20 | U1 | 4.19 | 1.71 | 0.83 | | 0.45 | 0.26 | | | |
| | U2 | 3.60 | 1.47 | 0.71 | | 0.39 | 0.22 | | | |
| | ΔU | 0.59 | 0.24 | 0.12 | | 0.06 | 0.04 | | | |
| C30 | U1 | | | | | | 0.48 | 0.30 | 0.20 | 0.09 |
| | U2 | | | | | | 0.11 | 0.07 | 0.05 | 0.02 |
| | ΔU | | | | | | 0.37 | 0.23 | 0.15 | 0.07 |
| C40 | U1 | | 1.44 | 0.69 | | 0.37 | 0.22 | | | |
| | U2 | | 0.94 | 0.45 | | 0.24 | 0.14 | | | |
| | ΔU | | 0.50 | 0.24 | | 0.13 | 0.08 | | | |
| C50 | U1 | | | | 0.40 | | 0.17 | | | |
| | U2 | | | | 0.40 | | 0.17 | | | |
| | ΔU | | | | 0.00 | | 0.00 | | | |

C10: chamber element 10. C20: chamber element 20.
C30: chamber element 30. C40: chamber element 40.
C50: chamber element 50.

The results of the above-mentioned experiments will now be explained with reference to Table 1. In the chamber element 10 of FIG. 3, ΔU was not greater than 0.2 mJ/mm for any S-Z strand pitch, and there was no turn-over of chamber element at all. For the chamber element 20 of FIG. 4, the following results were obtained. In the case where the S-Z strand pitch P was 400 mm, ΔU was 0.59 mJ/mm, and at least 30% of chamber elements turned over at S-Z reverse portions. In the case where the S-Z strand pitch P was 500 mm, ΔU was 0.24 mJ/mm, and the chamber elements turned over at S-Z reverse portions were less than 30% of the whole. In any of the cases where the S-Z strand pitch P was 600 mm, 700 mm, and 800 mm, ΔU was not greater than 0.2 mJ/mm, and no turn-over of chamber element occurred at all.

For the chamber element 30 of FIG. 5, the following results were obtained. In the case where the S-Z strand pitch P was 800 mm, ΔU was 0.37 mJ/mm, and at least 30% of chamber elements turned over at S-Z reverse portions. In the case where the S-Z strand pitch P was 900 mm, ΔU was 0.23 mJ/mm, and the chamber elements turned over at S-Z reverse portions were less than 30% of the whole. In the case where the S-Z strand pitch P was 1000 mm, ΔU was 0.15 mJ/mm, and the chamber elements turned over at S-Z reverse portions were less than 30% of the whole. In the case where the S-Z strand pitch P was 1200 mm, ΔU was 0.07 mJ/mm, and no turn-over of chamber element occurred at all.

Figure 6:
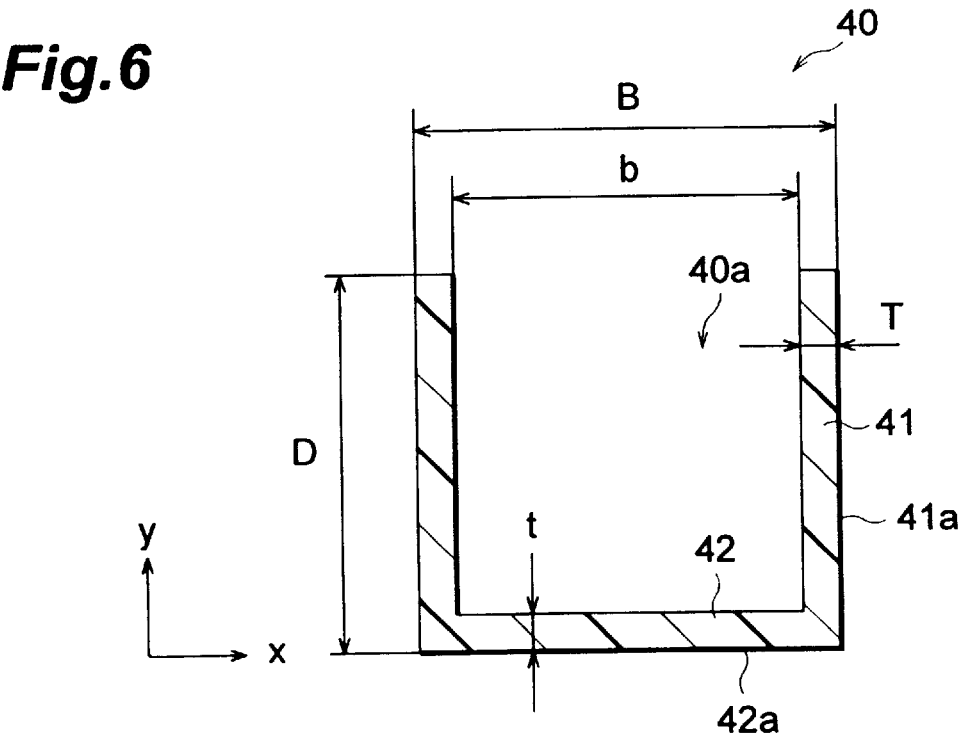
FIG. 6 is a sectional view of an optical cable chamber element.

For the chamber element 40 of FIG. 6, the following results were obtained. In the case where the S-Z strand pitch P was 500 mm, ΔU was 0.50 mJ/mm, and at least 30% of chamber elements turned over at S-Z reverse portions. In the case where the S-Z strand pitch P was 600 mm, ΔU was 0.24 mJ/mm, and the chamber elements turned over at S-Z reverse portions were less than 30% of the whole. In each of the cases where the S-Z strand pitch P was 700 mm and 800 mm, ΔU was not greater than 0.2 mJ/mm, and no turnover of chamber element occurred at all. In the chamber element 50 of FIG. 7, ΔU was not greater than 0.2 mJ/mm for any S-Z strand pitch P, and no turn-over of chamber element occurred at all.

These results of experiments reveal that, when the distortion energy difference ΔU satisfies ΔU≦0.2 mJ/mm, chamber elements at S-Z reverse portions do not turn over at all or, if any, the ratio at which they turn over is such a degree that is permissible in practice. Namely, when an optical cable and chamber elements are configured such as to satisfy a relational expression of:

$$\Delta U = U_1 - U_2 \leq 0.2 \, mJ/mm \tag{1}$$

the ratio at which chamber elements turn over at S-Z reverse portions Re can be reduced even in the chamber element whose flexural rigidity in the depth direction is smaller than that in the widthwise direction. Here, it is of course more preferable in terms of results of experiments if the optical cable and chamber elements are configured on the basis of a relational expression $\Delta U = U_1 - U_2 \leq 0.1$ mJ/mm.

Here, referring to the optical cable 1 shown in FIGS. 1 and 2, of distortion energy of each chamber element 10 at the S-Z reverse portion Re of the S-Z locus defined by the chamber element 10, the distortion energy $U_1$ yielded when the bottom face 12a of the chamber element 10 is in contact with the thickening layer 2 is $U_1$=0.83 mJ/mm. On the other hand, the distortion energy $U_2$ yielded when the side face 11a of the chamber element 10 is in contact with the thickening layer 2 is $U_2$=0.71 mJ/mm. Namely, $\Delta U = U_1 - U_2$=0.12 mJ/mm, thereby satisfying the condition defined in the above-mentioned relational expression (1). As a consequence, the optical cable 1 can be considered an optical cable in which chamber elements are hard to turn over at S-Z reverse portions Re and S-Z transit portions Tr, and which is excellent in transmission characteristics and easiness of taking out optical fibers.

Referring to the optical cable 60 shown in FIG. 8, either when the reverse pitch P is set to 650 mm or 800 mm, $\Delta U = U_1 - U_2$=0.00 mJ/mm, thereby satisfying the condition defined in the above-mentioned relational expression (1). As a consequence, the optical cable 60 can also be considered an optical cable in which chamber elements are hard to turn over at S-Z reverse portions Re and S-Z transit portions Tr, and which is excellent in transmission characteristics and easiness of taking out optical fibers.

On the other hand, conventionally employed as a material for forming chamber elements used in optical cables are PBT resin, PC/PBT resin, HDPE resin, and the like. When a chamber element is made of PBT resin or PC/PBT resin, its own rigidity becomes greater than necessary. When such a chamber element is bent in the widthwise direction x at an S-Z reverse portion Re, a side face of the chamber element comes into contact with the central member, whereby the fiber containing cavity fails to face correctly outward. Also, in the case where an optical cable is laid under an environment where ambient temperature is greatly variable, HDPE resin may be recrystallized within a chamber element made thereof. In this case, the chamber element may shrink in its longitudinal direction, thereby affecting its S-Z reversal angle $\phi$ and S-Z strand pitch P.

Hence, in order to prevent chamber elements from turning over at S-Z reverse portions Re and S-Z transit portions Tr, the inventors have diligently carried out studies concerning the materials of chamber elements used in optical cables. When selecting materials for forming chamber elements used in an optical cable, it is necessary to take account of their physical properties such as shock resistance, rigidity, strength, and the like, as well as environmental resistance properties such as low-temperature brittleness, anti-stress-cracking performance, and the like. In view of these points, the inventors conducted experiments explained hereinafter in order to find out optimal materials for forming chamber elements used in optical cables.

Figure 10:
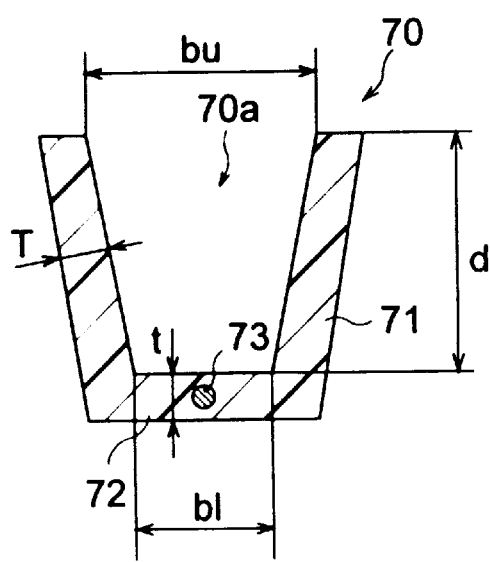
FIG. 10 is a sectional view of an optical cable chamber element.

FIG. 10 shows a sectional view of a chamber element used in these experiments. Depicted chamber element 70 is made as a straight elongated member. The chamber element 70 comprises a bottom part 72 and a pair of side wall parts 71 rising from both ends of the bottom part 72, and has substantially a U-shaped cross section. A fiber containing cavity 70a is defined by the bottom part 72 and the side wall parts 71. The bottom part 72 of the chamber element 70 incorporates therein a tension member 73 at a center portion in the widthwise direction x of the fiber containing cavity 70a. The chamber element 70 has such a size that bu=4.6 mm, bl=3.8 mm, d=4.7 mm, and T=t=about 1 mm. A plurality of chamber elements having such a shape were prepared while using mixed resins composed of PBT resin and HDPE resin in different compounding ratios, and PC/PBT resin and HDPE resin in different compounding ratios. The following seven kinds of chamber elements were used in the experiments.

Example 1

The chamber element in accordance with Example 1 was made of a mixed resin composed of PBT resin and HDPE resin. The volume ratio of HDPE resin in the mixed resin was 70%.

Example 2

The chamber element in accordance with Example 2 was made of a mixed resin composed of PBT resin and HDPE resin. The volume ratio of HDPE resin in the mixed resin was 50%.

Example 3

The chamber element in accordance with Example 3 was made of a mixed resin composed of PBT resin and HDPE resin. The volume ratio of HDPE resin in the mixed resin was 30%.

Comparison 1

The chamber element in accordance with Comparison 1 was made of a mixed resin composed of PBT resin and HDPE resin. The volume ratio of HDPE resin in the mixed resin was 85%.

Comparison 2

The chamber element in accordance with Comparison 2 was made of a mixed resin composed of PBT resin and HDPE resin. The volume ratio of HDPE resin in the mixed resin was 15%.

Comparison 3

The chamber element in accordance with Comparison 3 was made of HDPE resin alone.

Comparison 4

The chamber element in accordance with Comparison 4 was made of PBT resin alone.

A method of making the chamber element 70 will now be explained briefly. When molding the chamber element 70, while a tension member 73 is delivered to a cross-head die having a U-shaped die plate attached thereto, a mixed resin composed of PBT resin and HDPE resin or a mixed resin composed of PC/PBT resin and HDPE resin is pushed into the cross-head die. PBT resin or PC/PBT resin and HDPE resin are supplied to the cross-head die after being dry-blended in a blender. In this case, upon blending PBT resin or PC/PBT resin with HDPE resin, both resins can be blended in a uniformly dispersed state if an appropriate amount of an additive having a compatibilizing capacity such as wax is added thereto.

For the chamber elements 70 in accordance with the above-mentioned three kinds of Examples and four kinds of Comparisons, thermal shrinkage coefficient, flexural rigidity, and flexural buckling diameter were measured, and their results were shown in the following Table 2. Here, the thermal shrinkage coefficient refers to the shrinkage coefficient in the case where a chamber element having a length of 1 m was left for an hour in the atmosphere of 100° C. The flexural rigidity is that in the widthwise direction of the fiber containing cavity 70a. The flexural buckling diameter refers to the diameter at which the width of the fiber containing cavity 70a begins to change when the chamber element 70 is bent in the widthwise direction x.

TABLE 2

|  | THERMAL SHRINKAGE COEFFICIENT (%) | FLEXURAL RIGIDITY (kgfmm$^2$) | FLEXURAL BUCKLING DIAMETER (mm) |
| --- | --- | --- | --- |
| EXAMPLE 1 | 0.82 | 7.8 × 10$^3$ | 600 |
| EXAMPLE 2 | 0.71 | 9.5 × 10$^3$ | 650 |
| EXAMPLE 3 | 0.63 | 11.2 × 10$^3$ | 700 |
| COMPARISON 1 | 0.91 | 6.5 × 10$^3$ | 550 |
| COMPARISON 2 | 0.55 | 12.5 × 10$^3$ | 750 |

TABLE 2-continued

|  | THERMAL SHRINKAGE COEFFICIENT (%) | FLEXURAL RIGIDITY (kgfmm²) | FLEXURAL BUCKLING DIAMETER (mm) |
|---|---|---|---|
| COMPARISON 3 | 1.05 | $5.2 \times 10^3$ | 500 |
| COMPARISON 4 | 0.50 | $13.8 \times 10^3$ | 800 |

As shown in Table 2, the thermal shrinkage coefficient in each of the chamber elements in accordance with Examples 1 to 3 is smaller than that in each of the chamber elements in accordance with Comparisons 1 and 3. Also, the flexural rigidity of each of the chamber elements in accordance with Examples 1 to 3 is smaller than that of the chamber element in accordance with Comparison 4. Further, as for flexural buckling diameter, when the chamber element in accordance with Comparison 4 is bent in the widthwise direction x, the diameter at which the width of the fiber containing cavity 70a begins to change was large, i.e., 800 mm. By contrast, the flexural buckling diameter in the chamber elements in accordance with Examples 1 to 3 was small, i.e., 600 to 700 mm.

Then, optical cables were prepared by using the chamber elements of Examples 1 to 3 and Comparisons 1 to 4, and transmission performances of optical fibers included in the optical cables were measured. Each optical cable used in this experiment has a configuration similar to that shown in FIG. 8. Disposed at the center of the optical cable is a slotted member functioning as a central member. This slotted member is made of a synthetic resin such as HDPE resin or the like and has a diameter of 24.5 mm. The outer periphery of the slotted member is formed with 10 slots extending in an S-Z form along the longitudinal direction of the slotted member. In each slot, 10 ribbon fibers (optical fibers) are stacked. Around the outer periphery of the slotted member containing the ribbon fibers, a holding tape made of nonwoven or the like is wound tightly.

Assembled around the holding tape in an S-Z strand are 15 chamber elements in accordance with Examples and Comparisons, each containing 10 sheets of 8-core optical fiber tapes (each having a thickness of 0.3 mm and a width of 2.1 mm). A holding tape is further tightly wound around the chamber elements. Further disposed around this holding tape is an outside cladding made of low-density polyethylene. Thus formed optical cable has an outside diameter of 45 mm. In the experiments, while the reversal angle φ was set to 300°, optical cables having an S-Z strand pitch P of 900 mm and optical cables having an S-Z strand pitch P of 700 mm were prepared.

Then, for each optical cable, transmission performance of optical fibers contained in each chamber element was measured. Also, for the optical cables having an S-Z strand pitch P of 700 mm, transmission loss at a wavelength of 1.55 μm was measured and then, after 5 cycles of heat-cycle tests (from −30° C. to 70° C.) were effected, transmission characteristics were measured again. The following Table 3 shows the results of this experiment. As can be seen from the results shown in Table 3, the transmission loss in each of the optical cables using the chamber elements of Examples 1 to 3 is lower than that in each of the optical cables using the chamber elements of Comparisons 1 to 4. In particular, the optical cables using Comparisons 1 to 4 yield a very high transmission loss after the heat-cycle tests. By contrast, transmission loss hardly changes in the optical cables using the chamber elements of Examples 1 to 3.

TABLE 3

|  | PITCH 450 | PITCH 350 | AFTER HEAT CYCLE TEST |
|---|---|---|---|
| EXAMPLE 1 | 0.21–0.25 | 0.21–0.25 | 0.22–0.26 |
| EXAMPLE 2 | 0.20–0.24 | 0.21–0.25 | 0.21–0.26 |
| EXAMPLE 3 | 0.21–0.25 | 0.22–0.26 | 0.21–0.25 |
| COMPARISON 1 | 0.20–0.25 | 0.21–0.26 | 0.45–0.66 |
| COMPARISON 2 | 0.26–0.29 | 0.43–0.69 | 0.50–0.72 |
| COMPARISON 3 | 0.20–0.25 | 0.21–0.23 | 0.52–0.69 |
| COMPARISON 4 | 0.25–0.32 | 0.55–0.80 | 0.66–0.92 |

As mentioned above, these experiments have revealed that very good results can be obtained in practice when a mixed resin composed of PBT resin and HDPE resin is employed as a material for forming chamber elements used in optical cables. Namely, when a resin in which PBT resin and HDPE resin are mixed together is employed, a chamber element can be provided with an appropriate softness while maintaining its rigidity. Also, even when HDPE resin is recrystallized due to changes in ambient temperature, the shrinkage of the chamber element is minimized since PBT resin has a sufficient rigidity.

Also, as can be seen from the results of the experiments, it is preferred that the ratio of HDPE resin in the mixed resin composed of PBT resin and HDPE resin be 20% to 80% by volume. In this case, while the rigidity of chamber elements is maintained, the chamber elements can be quite effectively restrained from shrinking upon changes in ambient temperature. Here, it has been confirmed that very good results can also be obtained in practice when a mixed resin composed of PC/PBT resin (in which PBT resin and polycarbonate resin are blended together) and HDPE resin is used, in place of the mixed resin composed of PBT resin and HDPE resin, as a material for forming chamber elements used in optical cables. Also in this case, it is preferred that the ratio of HDPE resin in the mixed resin composed of PC/PBT resin and HDPE resin be 20% to 80% by volume.

The foregoing experiments employ optical cables in which individual chamber elements are assembled around the outer periphery of a slotted member in an S-Z strand. On the other hand, it has been confirmed that similarly favorable results are also obtained in the case using an optical cable, such as that shown in FIG. 1, in which chamber elements are assembled around an elongated thickening layer.

In order to prevent a chamber element from turning over at S-Z reverse portions Re and S-Z transit portions Tr, it is preferred that the bottom part of the chamber element be provided with a tension member. In general, when providing the bottom part of a chamber element used in an optical cable with a tension member, the tension member is introduced into a die, and a molten resin is extruded from a nozzle together with the tension member. When thus extruded resin hardens, the amount of shrinkage of the resin forming the bottom part of the chamber element in the depth direction thereof in the part where the tension member exists is different from that in the other parts. Namely, the amount of shrinkage of the resin in the part where the tension member exists becomes smaller than the amount of shrinkage of the resin in the other parts. As a result, irregularities would occur in the floor face of the fiber containing cavity, i.e., the inner face of the bottom part.

Here, when bending or tensile force is applied to an optical cable using a chamber element in such a state, a force directed to the center axis of the optical cable acts on an optical fiber contained in the fiber containing cavity of the chamber element. Accordingly, the optical fiber is pressed again st the floor face of the fiber containing cavity. When the floor face of the fiber containing cavity has irregularities, the optical fiber is bent along the irregularities, thereby generating so-called microbend. As a result, transmission characteristics of the optical cable are deteriorated. Also, the thickness of the bottom part of the chamber element is very small (about 0.4 to 1.5 mm). The tension member has a certain degree of thickness as well. Consequently, the influence on the transmission characteristics of the optical cable exerted by the irregularities existing in the floor face of the fiber containing cavity is not negligible. It becomes an important issue in an optical cable having a small diameter in which a number of optical fibers are mounted, in particular.

Hence, mainly from the viewpoint of keeping transmission characteristics of optical cables favorably, the inventors have diligently carried out studies concerning dispositions of tension members with respect to chamber elements, thereby preparing various kinds of chamber elements and performing experiments concerning optical cables using these chamber elements.

Example 4

Figure 11:
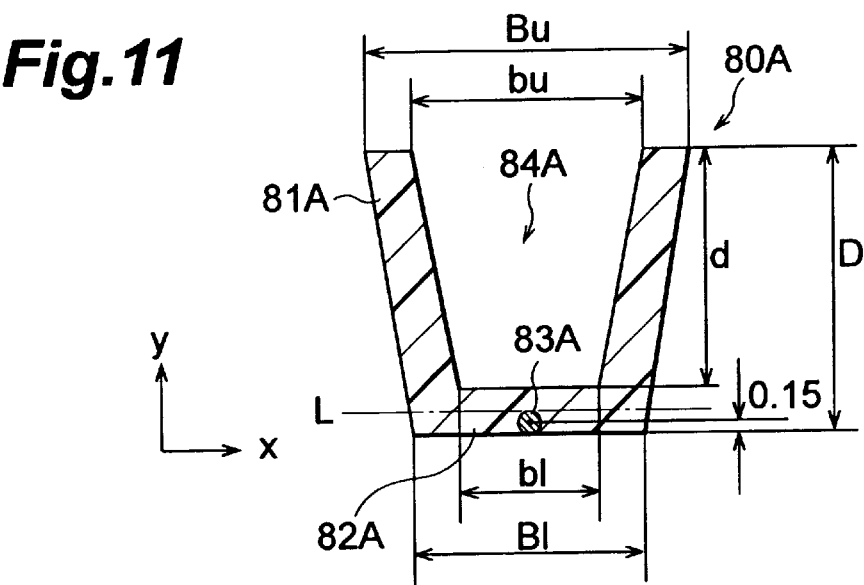
FIG. 11 is a sectional view of an optical cable chamber element.

FIG. 11 shows a sectional view of a chamber element 80A in accordance with Example 4. Depicted chamber element 80A is made as a straight elongated member. The chamber element 80A comprises a bottom part 82A and a pair of side wall parts 81A rising from both ends of the bottom part 82A, and has substantially a U-shaped cross section. A fiber containing cavity 84A is defined by the bottom part 82A and the side wall parts 81A. The chamber element 80A has such a size that Bu=7.0 mm, Bl=5.3 mm, D=5.2 mm, bu=4.6 mm, bl=3.8 mm, and d=4.7 mm.

The bottom part 82A of the chamber element 80A incorporates therein a tension member 83A disposed at a center portion in the widthwise direction of the fiber containing cavity 84A. As the tension member 83A, a thread of 1140-denier aromatic polyamide fiber is employed. As shown in FIG. 11, the tension member 83A is disposed such that its center axis is separated from the outer face of the bottom part 82A (bottom face of the chamber element 80A) by 0.15 mm. Namely, the tension member 83A is disposed in the state where its center axis is close to the bottom face of the chamber element 80A. More specifically, the tension member 83A is disposed such that its center axis is dislocated toward the bottom face of the chamber element 80A from the center line L between the inner face of the bottom part 82A and the outer face of the bottom part 82A (bottom face of the chamber element 80A).

Figure 12:
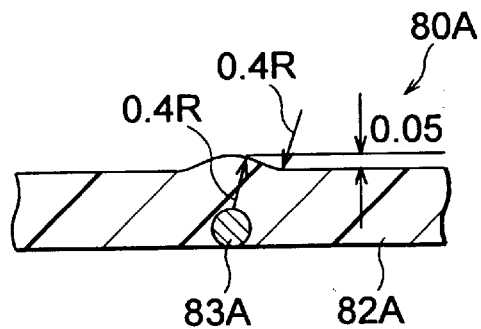
FIG. 12 is a partly enlarged sectional view of the optical cable chamber element shown in FIG. 11.

The chamber element 80A was extrusion-molded by supplying PBT resin at 260° C. around the tension member 83A while taking up at a rate of 15 m/min the tension member 83A introduced to the cross-head die of a melt extruder. FIG. 12 shows a sectional view of the bottom part 82A of thus finished chamber element 80A. As depicted, the difference in level of irregularities generated in the inner face of the bottom part 82A was 0.05 mm. The radius of curvature of the irregularities was 0.4 mm.

Further prepared was an optical cable having substantially the same configuration as that of the optical cable 60 shown in FIG. 8. The central member of thus prepared optical fiber was a slotted member having an outside diameter of 24.5 mm made of HDPE. The outer periphery of the slotted member was formed with 10 slots each having a width of 4.6 mm and a depth of 4.6 mm (S-Z reversal angle φ=300°; S-Z strand pitch P=720 mm). Incorporated in the center of this slotted member was a tension member in which 7 steel wires each having an outside diameter of 2 mm were stranded together. In each slot, 10 sheets of 8-core ribbon fibers each having a thickness of 0.3 mm and a width of 2.1 mm were stacked. Around the slotted member, a holding tape was wound tightly.

Assembled in an S-Z strand around the holding tape were 15 chamber elements 80A (S-Z reversal angle φ=300°, S-z strand pitch P=720 mm). Each chamber element 80A contained 10 sheets of 8-core ribbon fibers. A holding tape was tightly wound around the chamber elements 80A. Disposed around the outer periphery of this holding tape was an outside cladding made of polyethylene. The length and outside diameter of thus formed optical cable were 200 m and 45 mm, respectively. For the optical fibers contained in each chamber element 80A of thus obtained optical cable, transmission loss at a wavelength of 1.55 µm was measured. As a result, for all of the 15 chamber elements 80A, transmission loss was within the range of 0.21 to 0.25 dB/km, with no increase in transmission loss being observed.

Example 5

Figure 13:
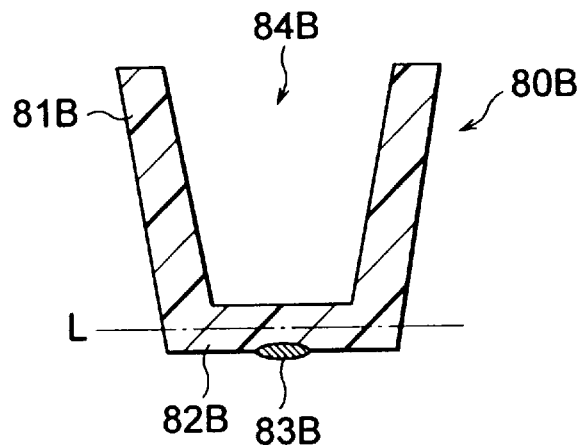
FIG. 13 is a sectional view of an optical cable chamber element.

FIG. 13 shows a sectional view of a chamber element 80B in accordance with Example 5. Depicted chamber element 80B employs a thread of 1420-denier aromatic polyamide fiber as a tension member 83B. As shown in FIG. 13, the tension member 83B is disposed such as to be close to the bottom face of the chamber element 80B. More specifically, the tension member 83B is disposed such as to be dislocated, as a whole, toward the bottom face of the chamber element 80B from the center line L between the inner face of the bottom part 82B and the outer face of the bottom part 82B (bottom face of the chamber element 80B). The dimensions (Bu, Bl, D, bu, bl, and d) of the chamber element 80B are identical to those of the chamber element 80A shown in FIG. 11. In the chamber element 80B, as shown in FIG. 13, the tension member 83B is partly exposed from the bottom face of the chamber element 80B (outer face of the bottom part 82B).

Thus finished chamber element 80B was cut, and its cross section was observed, which revealed that the difference in level of irregularities generated in the inner face of the bottom part 82B was 0.05 mm. The radius of curvature of the irregularities was not smaller than 0.5 mm. By using the chamber element 80B, an optical cable having a length of 200 m was prepared under the same conditions as those in Example 4. For the optical fibers conditioned in each chamber element 80B of thus obtained optical cable, transmission loss at a wavelength of 1.55 µm was measured. As a result, for all of the 15 chamber elements 80B, no increase in transmission loss was found.

Comparison 5

Figure 14:
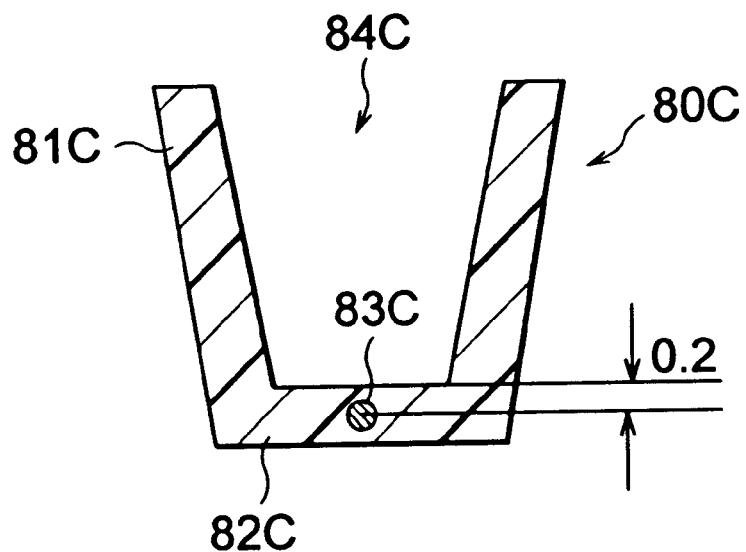
FIG. 14 is a sectional view of an optical cable chamber element.
Figure 15:
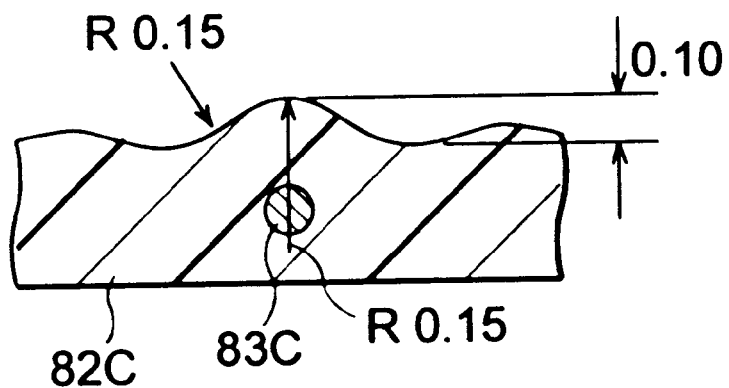
FIG. 15 is a partly enlarged sectional view of the optical cable chamber element shown in FIG. 14.

FIG. 14 shows a sectional view of a chamber element 80C in accordance with Comparison 5. Depicted chamber element 80C employs a thread of 1140-denier aromatic polyamide fiber as a tension member 83C. As shown in FIG. 14, the tension member 83C is disposed such that its center axis is separated from the inner face of the bottom part 82C (floor face of the fiber containing cavity 84C) by 0.20 mm. The other conditions (dimensions and so forth) are identical to those of the chamber element 80A of Example 4. Thus finished chamber element 80C was cut, and its cross section was observed, which revealed that the difference in level of irregularities generated in the inner face of the bottom part 82C was 0.10 mm as shown in FIG. 15. The radius of curvature of the irregularities was 0.10 mm. By using the chamber element 80C, an optical cable having a length of 200 m was prepared under the same conditions as those in Example 4. For the optical fibers contained in each chamber element 80C of thus obtained optical cable, transmission loss at a wavelength of 1.55 µm was measured. As a result, two optical fibers in contact with the floor face of the fiber containing cavity 84C yielded transmission loss values of 0.70 dB/km and 0.85 dB/km, respectively, which were found inappropriate in practice.

Comparison 6

Figure 16:
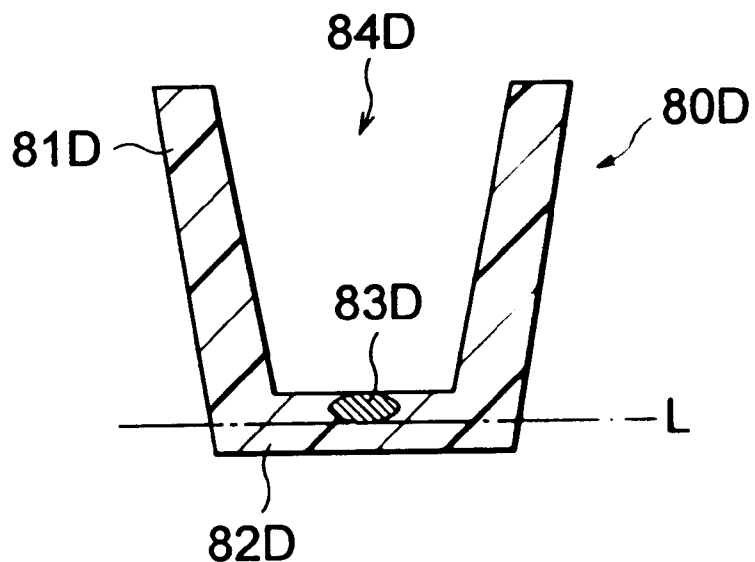
FIG. 16 is a sectional view of an optical cable chamber element.
Figure 17:
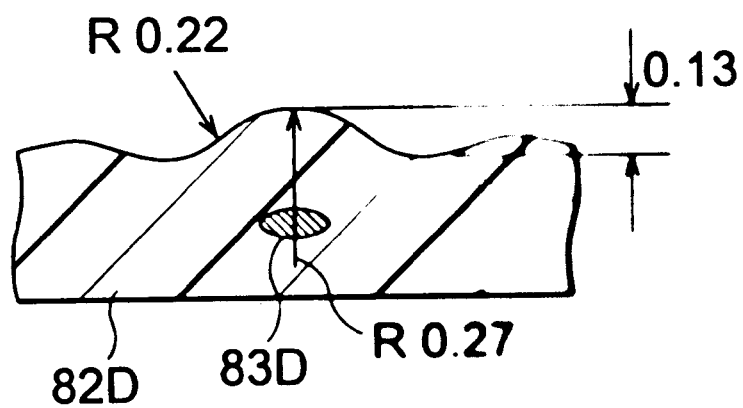
FIG. 17 is a partly enlarged sectional view of the optical cable chamber element shown in FIG. 16.
Figure 18:
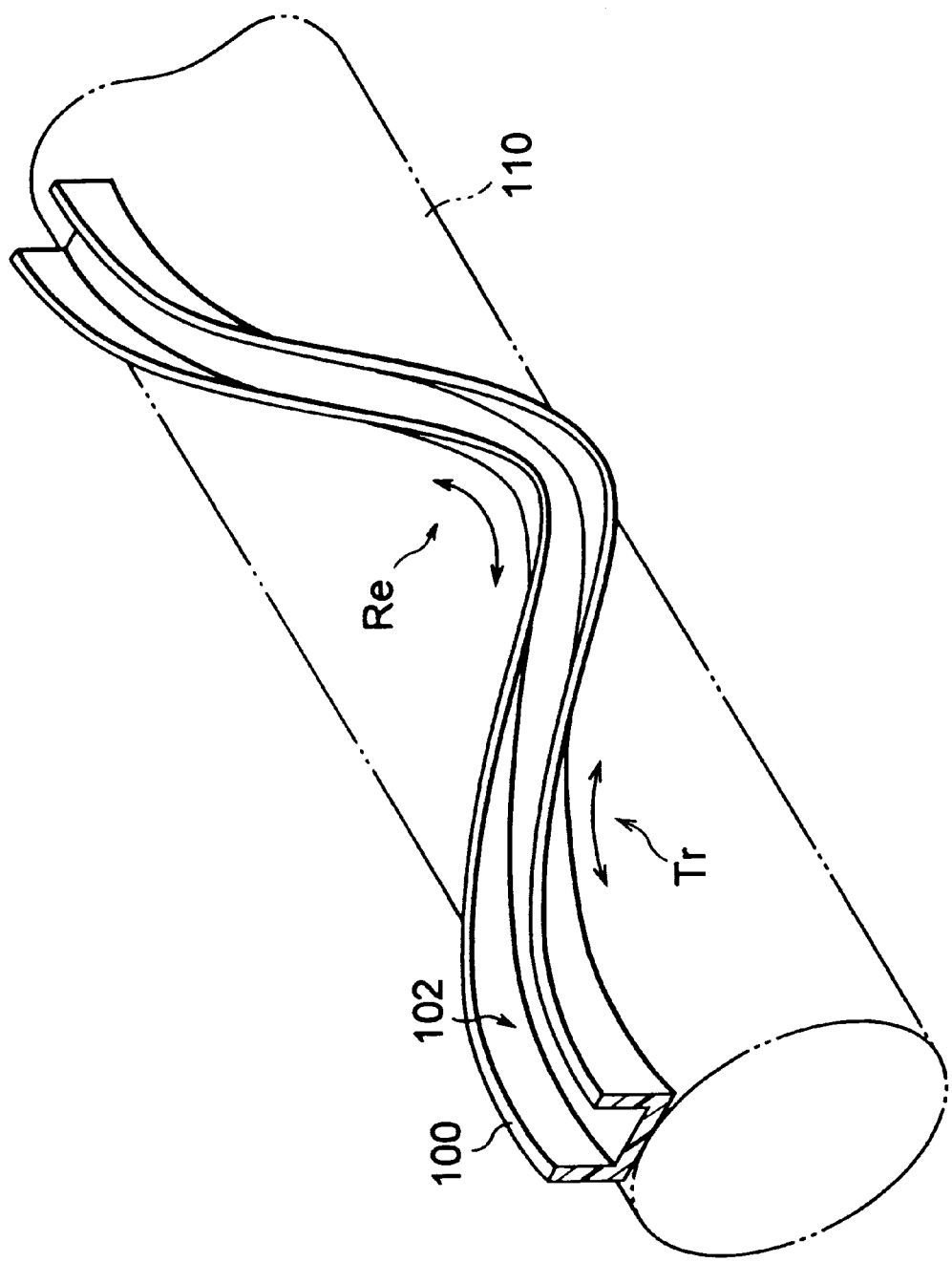
FIG. 18 is a perspective view showing an optical cable chamber element assembled around a central member in an S-Z strand.
Figure 19:
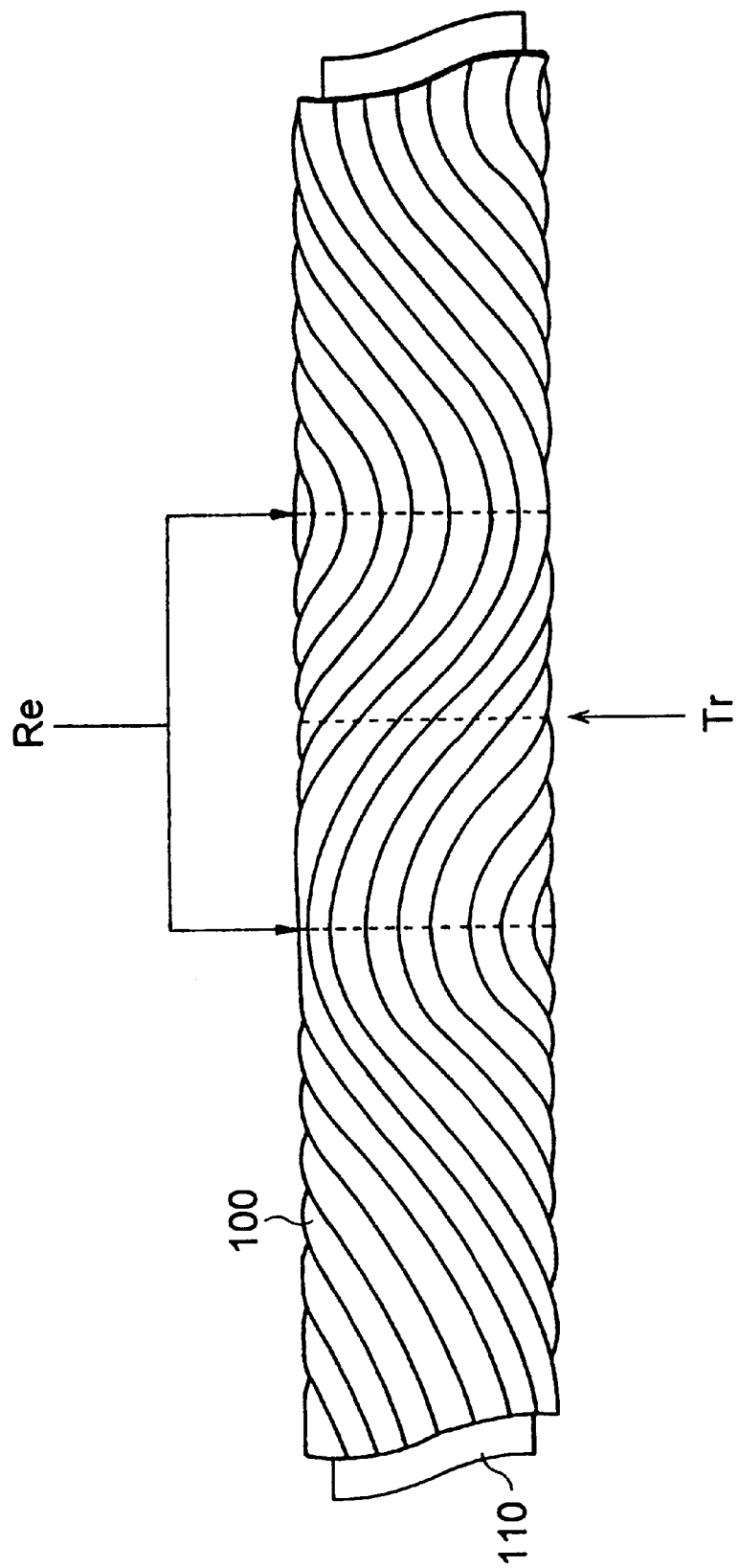
FIG. 19 is a side view showing an optical cable in which chamber elements are assembled around a central member in an S-Z strand.
Figure 20:
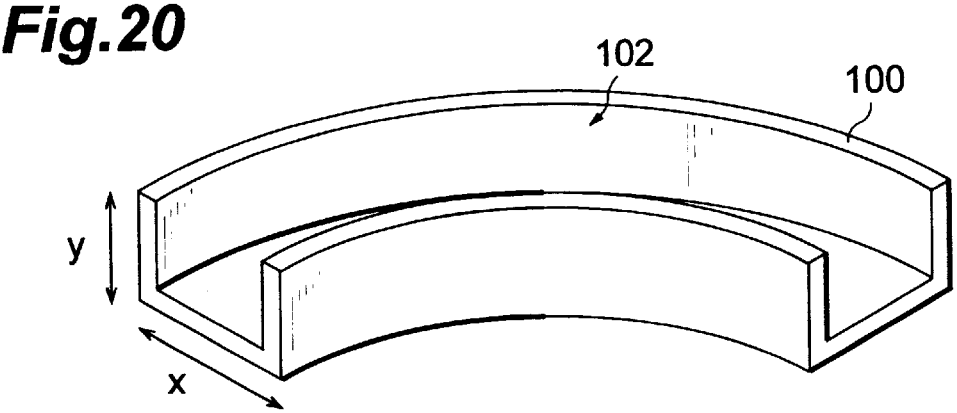
FIG. 20 is a perspective view showing a chamber element bent in the widthwise direction.
Figure 21:
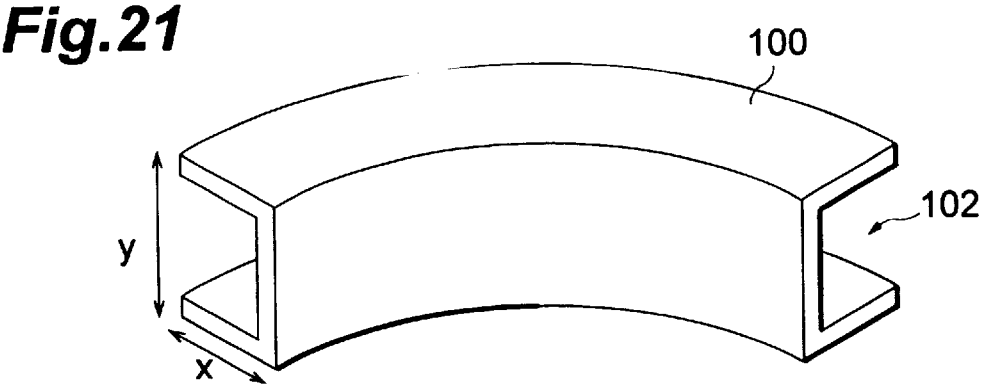
FIG. 21 is a perspective view showing a chamber element bent in the depth direction.
Figure 22:
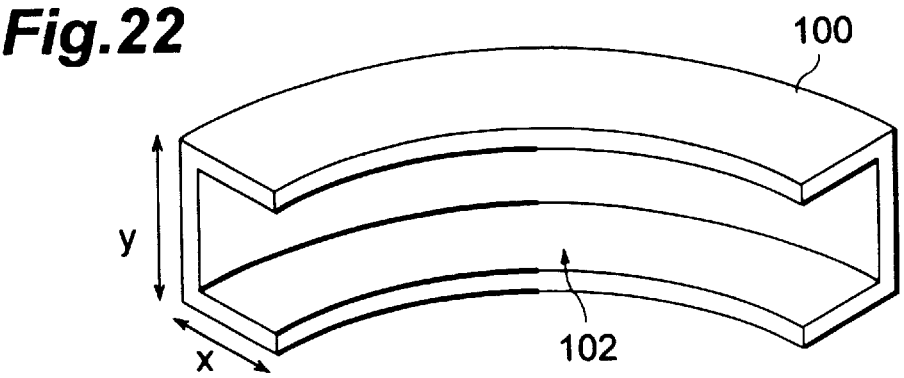
FIG. 22 is a perspective view showing a chamber element bent in the depth direction.
Figure 23:
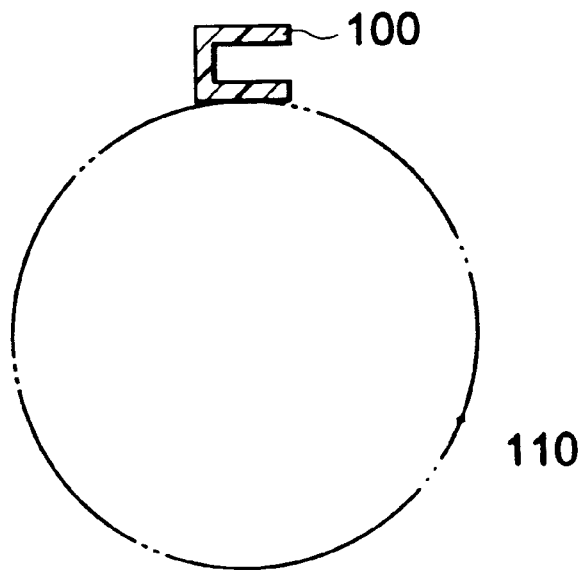
FIG. 23 is a sectional view showing the state where a chamber element is turned over.
Figure 24:
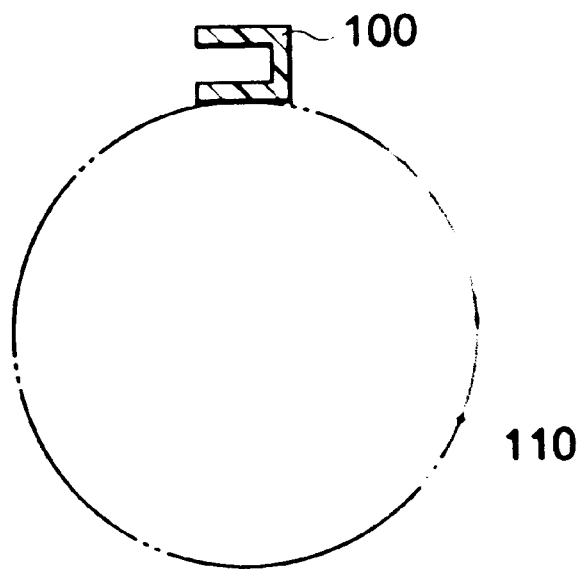
FIG. 24 is a sectional view showing the state where a chamber element is turned over.

FIG. 16 shows a sectional view of a chamber element 80D in accordance with Comparison 6. Depicted chamber element 80D employs a thread of 1420-denier aromatic polyamide fiber as a tension member 83D. As shown in FIG. 16, the tension member 83D is disposed such as to be dislocated, as a whole, toward the fiber containing cavity 84D from the center line L between the inner face of the bottom part 82D and the outer face of the bottom part 82D (bottom face of the chamber element 80D). The other conditions (dimensions and so forth) are identical to those of the chamber element 80B of Example 5. Thus finished chamber element 80D was cut, and its cross section was observed, which revealed that the difference in level of irregularities generated in the inner face of the bottom part 82D was 0.13 mm as shown in FIG. 17. The radius of curvature of the irregularities was 0.20 mm. By using the chamber element 80D, an optical cable having a length of 200 m was prepared under the same conditions as those in Example 4. For the optical fibers contained in each chamber element 80D of the optical cable, transmission loss at a wavelength of 1.55 µm was measured. As a result, among optical fibers located near the floor face of the fiber containing cavity 84D, several optical fibers were found to yield transmission loss exceeding 0.5 dB/km, thus being inappropriate in practice.

The results of these experiments indicate that, as with the chamber elements 80A and 80B in which the tension member 83A, 83B is disposed with respect to the chamber element 80A, 80B in the state where its center axis is close to the bottom face of the latter, the above-mentioned irregularities can be restrained from occurring due to the difference in resin shrinkage amount between the part where the tension member exists and the other parts. As a consequence, it becomes unnecessary to eliminate thus generated irregularities, for example, by shaving them off with a cutting tool or by flattening them against a heated plate or roller. Hence, chamber elements used in an optical cable can be produced economically without increasing manufacturing steps. Further, when forming a chamber element from a thermoplastic resin, it becomes unnecessary to add inorganic matters or the like, which may deteriorate smoothness of the fiber containing cavity, to the thermoplastic resin.

Also, as with the chamber element 80B, very good results can be obtained in practice when the tension member 83B is disposed such as to be close to the bottom face. In this case, the tension member 83B is placed farther away from the floor face of the fiber containing cavity 84B (inner face of the bottom part), whereby the irregularities can be quite effectively restrained from occurring. The foregoing experiments employ optical cables in which individual chamber elements are assembled around the outer periphery of a slotted member in an S-Z strand. On the other hand, it has been confirmed that similarly favorable results are also obtained in the case using an optical cable, such as that shown in FIG. 1, in which chamber elements are assembled around an elongated thickening layer.

As explained in the foregoing, the present invention can realize an optical cable in which chamber elements are less likely to turn over in any of S-Z reverse portions and S-Z transit portions and which is excellent in transmission characteristics and easiness of taking out optical fibers therefrom, and an optical fiber chamber element applicable to this optical cable.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical cable having a plurality of optical fibers, said optical cable comprising:
 a central member;
 a plurality of chamber elements respectively having fiber containing cavities for containing said optical fibers, each said chamber element having such a characteristic that a flexural rigidity in a depth direction of the fiber containing cavity thereof is smaller than a flexural rigidity in a widthwise direction of said fiber containing cavity; and
 an S-Z stranded part in which said chamber elements containing said optical fibers are assembled around said central member in an S-Z strand,
 wherein, assuming, of distortion energy of said each chamber element in an S-Z reverse portion within said S-Z stranded part, the distortion energy yielded when a bottom face of said chamber element is in contact with said central member to be $U_1$, and the distortion energy yielded when a side face of said each chamber element is in contact with said central member to be U2, $\Delta U = U_1 - U_2 \leq 0.2 (mJ/mm)$ is satisfied.

2. An optical cable according to claim 1, wherein said chamber element is made of a mixed resin composed of PBT resin and HDPE resin.

3. An optical cable according to claim 1, wherein said chamber element is made of a mixed resin composed of PC/PBT resin and HDPE resin.

4. An optical cable according to claim 2, wherein said HDPE resin occupies 20% to 80% by volume of said mixed resin.

5. An optical cable according to claim 3, wherein said HDPE resin occupies 20% to 80% by volume of said mixed resin.

6. An optical cable according to claim 1, wherein said chamber element comprises a bottom part and a pair of side wall parts rising from both ends of said bottom part, said fiber containing cavity being defined by said bottom part and said side wall parts.

7. An optical cable according to claim 6, wherein said chamber element further comprises a tension member disposed at a center portion of said bottom part in said widthwise direction.

8. An optical cable according to claim 7, wherein said tension member is disposed such that a center axis thereof is close to said bottom face.

9. An optical cable according to claim 7, wherein said tension member is disposed such as to be close to said bottom face.

10. An optical cable according to claim 1, wherein said central member is a thickening layer made of a synthetic resin incorporating therein a steel strand.

11. An optical cable according to claim 1, wherein said central member is a slotted member containing a plurality of optical fibers.

12. An optical cable chamber element, having a fiber containing cavity for containing an optical fiber, adapted to be stranded around a central member of an optical cable, said chamber element comprising:

a bottom part; and a pair of side wall parts rising from both ends of said bottom part and defining, together with said bottom part, said fiber containing cavity;

wherein said chamber element has such a characteristic that a flexural rigidity in a depth direction of said fiber containing cavity is smaller than a flexural rigidity in a widthwise direction of said fiber containing cavity; and wherein, assuming, of distortion energy of said chamber element in an S-Z reverse portion within an S-Z stranded part in which said chamber element is assembled around said central member in an S-Z strand, the distortion energy yielded when a bottom face of said bottom part is in contact with said central member to be $U_1$, and the distortion energy yielded when a side face of said side wall parts is in contact with said central member to be $U_2$, $\Delta U = U_1 - U_2 \leq 0.2$ (mJ/mm) is satisfied; and a tension member disposed at a center portion of said bottom part in said widthwise direction.

13. An optical cable chamber element according to claim 12, wherein said tension member is disposed such that a center axis thereof is close to said bottom face.

14. An optical cable chamber element according to claim 12, wherein said tension member is disposed such as to be close to said bottom face.

* * * * *